(12) United States Patent
Li et al.

(10) Patent No.: US 11,834,375 B2
(45) Date of Patent: Dec. 5, 2023

(54) FIRE RESISTANT GYPSUM BOARD AND RELATED METHODS

(71) Applicant: United States Gypsum Company, Chicago, IL (US)

(72) Inventors: Qinghua Li, Rolling Meadows, IL (US); Mark K. Hemphill, Hawthorn Woods, IL (US); Naveen Punati, Lake Zurich, IL (US)

(73) Assignee: United States Gypsum Company, Chicago, IL (US)

( * ) Notice: Subject to any disclaimer, the term of this patent is extended or adjusted under 35 U.S.C. 154(b) by 164 days.

(21) Appl. No.: 17/156,258

(22) Filed: Jan. 22, 2021

(65) Prior Publication Data

US 2021/0238096 A1    Aug. 5, 2021

Related U.S. Application Data

(60) Provisional application No. 62/968,820, filed on Jan. 31, 2020.

(51) Int. Cl.
*B32B 3/10*    (2006.01)
*C04B 28/14*   (2006.01)
(Continued)

(52) U.S. Cl.
CPC ............. *C04B 28/14* (2013.01); *B28B 1/008* (2013.01); *B28B 19/0015* (2013.01);
(Continued)

(58) Field of Classification Search
None
See application file for complete search history.

(56) References Cited

U.S. PATENT DOCUMENTS

| 3,306,765 A | 2/1967 | De Fresne et al. |
| 3,573,947 A | 4/1971 | Kinkade et al. |

(Continued)

FOREIGN PATENT DOCUMENTS

| EP | 0258064 A2 | 3/1988 |
| EP | 0543349 A1 | 5/1993 |

(Continued)

OTHER PUBLICATIONS

Ariyanayagam et al., "Fire tests of non-load bearing light gauge steel frame walls lined with calcium silicate boards and gypsum plasterboards," *Thin-Walled Structures*, 115: 86-99 (2017).

(Continued)

*Primary Examiner* — Christopher M Polley
(74) *Attorney, Agent, or Firm* — Leydig, Voit & Mayer, Ltd.

(57) ABSTRACT

Disclosed are a composite gypsum board and a method of preparing composite gypsum board. The board contains a set gypsum core sandwiched between two cover sheets. The core is formed from a slurry containing stucco, water, and optional ingredients such as foaming agent, accelerator, retarder, polyphosphate, starch, and dispersant, and core intumescent material. The board also contains at least one skim coat and/or hard edges. A face skim coat layer can be included on one side of the core, facing a face cover sheet. A back skim coat layer can be included on the other side of the core, facing a back cover sheet. Hard edges are known in the art and can be formed, e.g., continuously from a stucco slurry for forming the face and/or back skim coats. Preferably, the back skim coat layer and/or the hard edges are formed from a slurry containing stucco, water, skim coat or edge intumescent material (which have the same desired characteristics), and other optional additives as desired. The skim coat or edge intumescent material can be composed of (Continued)

the same material as the core intumescent material, if desired, but the skim coat and/or edge intumescent material is present in a higher relative concentration in its respective slurry than the amount of core intumescent material in the core slurry. Examples of suitable intumescent materials include expandable vermiculite (e.g., No. 4 or No. 5 according to the US naming system, or combinations thereof), expandable graphite, perlite, or any combination thereof.

20 Claims, 3 Drawing Sheets

(51) Int. Cl.

| | | |
|---|---|---|
| C04B 14/20 | (2006.01) | |
| B28B 1/00 | (2006.01) | |
| B28B 19/00 | (2006.01) | |
| B32B 13/08 | (2006.01) | |
| C04B 111/28 | (2006.01) | |
| C04B 111/00 | (2006.01) | |

(52) U.S. Cl.
CPC .......... *B28B 19/0092* (2013.01); *B32B 13/08* (2013.01); *C04B 14/202* (2013.01); *B32B 2264/102* (2013.01); *B32B 2307/3065* (2013.01); *B32B 2607/00* (2013.01); *C04B 2111/00629* (2013.01); *C04B 2111/285* (2013.01)

(56) References Cited

U.S. PATENT DOCUMENTS

| | | | |
|---|---|---|---|
| 3,616,173 A | 10/1971 | Green et al. | |
| 3,853,571 A | 12/1974 | Gelbman | |
| 4,405,682 A | 9/1983 | Fujita et al. | |
| 4,994,113 A | 2/1991 | Helmstetter | |
| 5,643,510 A | 7/1997 | Sucech | |
| 5,683,635 A | 11/1997 | Sucech et al. | |
| 6,342,284 B1 | 1/2002 | Yu et al. | |
| 6,409,825 B1 | 6/2002 | Yu et al. | |
| 6,494,609 B1 | 12/2002 | Wittbold et al. | |
| 6,632,550 B1 | 10/2003 | Yu et al. | |
| 6,669,919 B1 | 12/2003 | Greinke | |
| 6,815,049 B2 | 11/2004 | Veeramasuneni et al. | |
| 6,822,033 B2 | 11/2004 | Yu et al. | |
| 6,874,930 B2 | 4/2005 | Wittbold et al. | |
| 7,364,676 B2 | 4/2008 | Sucech et al. | |
| 7,776,170 B2 * | 8/2010 | Yu | E04F 13/04 156/39 |
| 7,811,685 B2 | 10/2010 | Wang et al. | |
| 7,833,638 B2 | 11/2010 | Zheng et al. | |
| 8,323,785 B2 | 12/2012 | Yu et al. | |
| 8,974,925 B1 | 3/2015 | Cao et al. | |
| 10,421,250 B2 | 9/2019 | Li et al. | |
| 10,421,251 B2 | 9/2019 | Li et al. | |
| 2003/0175478 A1 | 9/2003 | Leclercq | |
| 2006/0070321 A1 | 4/2006 | Au | |
| 2008/0286609 A1 | 11/2008 | Surace et al. | |
| 2008/0308968 A1 | 12/2008 | Immordino, Jr. | |
| 2010/0247937 A1 | 9/2010 | Liu et al. | |
| 2011/0195241 A1 | 8/2011 | Yu et al. | |
| 2012/0168527 A1 | 7/2012 | Li et al. | |
| 2012/0170403 A1 | 7/2012 | Li et al. | |
| 2012/0207989 A1 | 8/2012 | Xu et al. | |
| 2014/0113124 A1 | 4/2014 | Sang et al. | |
| 2014/0130435 A1 | 5/2014 | Paradis et al. | |
| 2015/0010767 A1 | 1/2015 | Sang et al. | |
| 2015/0103861 A1 | 4/2015 | Cao et al. | |
| 2015/0104629 A1 | 4/2015 | Cao et al. | |
| 2015/0125683 A1 | 5/2015 | Cao et al. | |
| 2016/0375656 A1 | 12/2016 | Li et al. | |
| 2016/0376191 A1 | 12/2016 | Li et al. | |
| 2017/0246838 A1 | 8/2017 | Rohlf | |
| 2018/0079691 A1 | 3/2018 | Donelan et al. | |
| 2018/0119417 A1 | 5/2018 | Li et al. | |

FOREIGN PATENT DOCUMENTS

| | | |
|---|---|---|
| EP | 2762522 A1 | 8/2014 |
| FR | 862160 A | 2/1941 |
| JP | H10-218688 A | 8/1998 |
| WO | WO 2019/241379 A1 | 12/2019 |

OTHER PUBLICATIONS

Chen et al., "Fire Resistance Prediction of Load Bearing Cold-Formed Steel Walls Lined with Gypsum Composite Panels," *International Specialty Conference on Cold-Formed Steel Structures 2*, St. Louis, Missouri, USA (Nov. 5 & 6, 2014).

Giannopoulou et al., "Fire Resistant Geopolymers Synthesized from Industrial Wastes," *World Journal of Engineering*, 5(3): 130-131 (2008).

European Patent Office, International Search Report in International Application No. PCT/US2020/036608 (dated Sep. 17, 2020).

U.S. Appl. No. 16/804,936, filed Feb. 28, 2020, Pending.

European Patent Office, International Search Report in International Application No. PCT/US2021/015478 (dated Apr. 23, 2021).

U.S. Appl. No. 13/335,396, filed Dec. 22, 2011, Never Issued: Abandoned/Expired.

U.S. Appl. No. 15/186,176, filed Jun. 17, 2016, Patented.
U.S. Appl. No. 15/186,212, filed Jun. 17, 2016, Pending.
U.S. Appl. No. 15/186,232, filed Jun. 17, 2016, Patented.
U.S. Appl. No. 15/186,257, filed Jun. 17, 2016, Pending.

\* cited by examiner

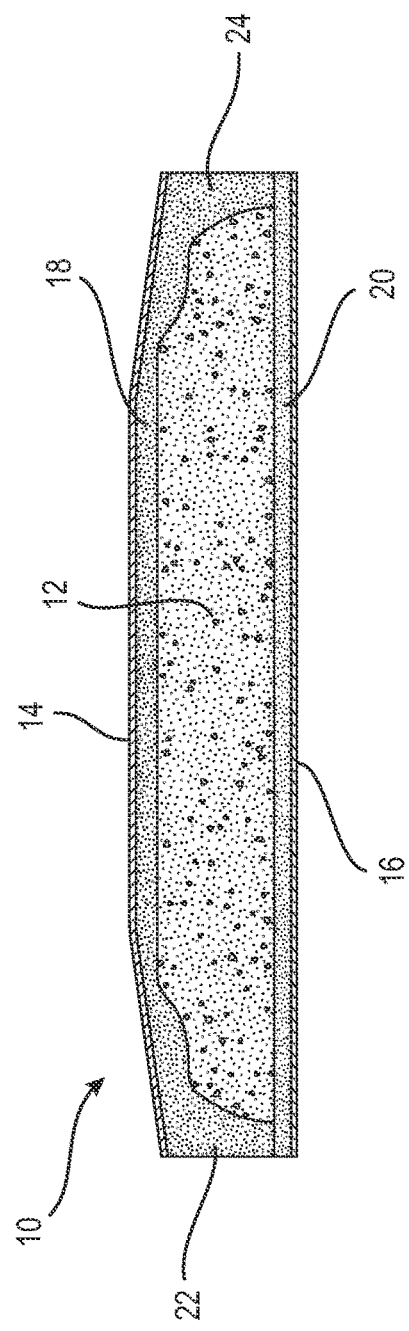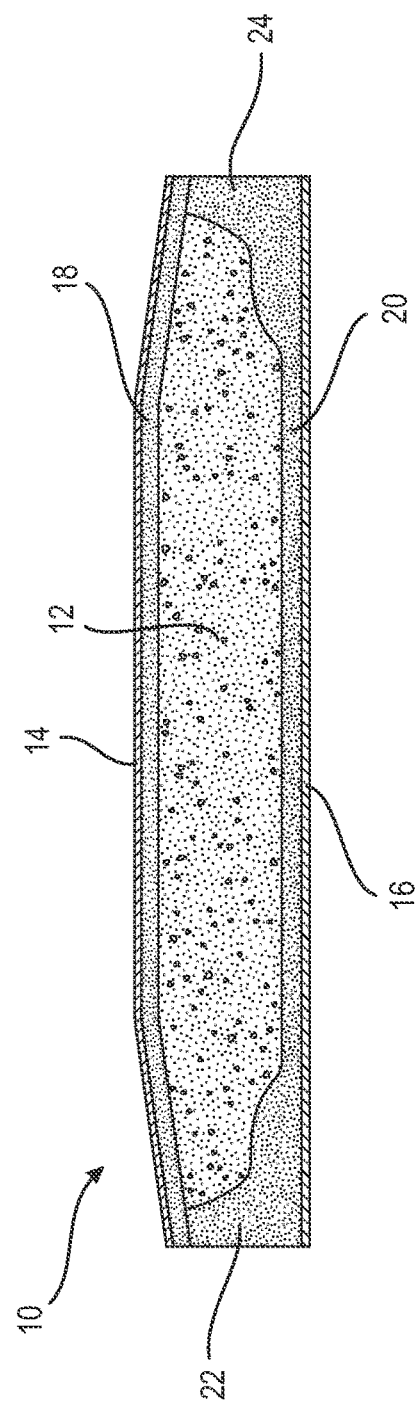

FIRE RESISTANT GYPSUM BOARD AND RELATED METHODS

CROSS-REFERENCE TO RELATED APPLICATION

This patent application claims the benefit of priority to U.S. Provisional Patent Application No. 62/968,820, filed Jan. 31, 2020, which is incorporated by reference in its entirety herein.

BACKGROUND

Set gypsum is a well-known material that is used in many products, including panels and other products for building construction and remodeling. One such panel (often referred to as gypsum board) is in the form of a set gypsum layer sandwiched between two cover sheets (e.g., paper-faced board) and is commonly used in drywall construction of interior walls and ceilings of buildings. One or more dense layers, often referred to as "skim coats" may be included on either side of the core, usually at the paper-core interface.

During manufacture of the board, stucco (i.e., calcined gypsum in the form of calcium sulfate hemihydrate and/or calcium sulfate anhydrite), water, and other ingredients as appropriate are mixed in a mixer (e.g., a pin mixer known in the art). A slurry is formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of, e.g., a forming plate or the like. The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of the interlocking matrix of set gypsum crystals, thereby imparting strength to the gypsum structure in the product. Heat is required (e.g., in a kiln) to drive off the remaining free (i.e., unreacted) water to yield a dry product.

One benefit of using gypsum in wallboard is that gypsum has a natural fire resistance property. Should the finished gypsum board be exposed to relatively high temperatures, such as those produced by high temperature flames or gases, portions of the set gypsum layer may absorb sufficient heat to start the release of water from the gypsum dihydrate crystals of the core. The absorption of heat and release of water from the gypsum dihydrate may be sufficient to retard heat transmission through or within the panels for a time. Gypsum board may experience shrinkage of the panel dimensions in one or more directions as one result of some or all of these high temperature heating effects, and such shrinkage may cause failures in the structural integrity of the board.

Some gypsum board products are designed to have enhanced fire resistance as compared with the property of the set gypsum alone. One example of an additive that enhances the fire resistance of gypsum board is high expansion vermiculite, which can be included in the gypsum slurry for forming the gypsum board, as described in, e.g., U.S. Pat. No. 8,323,785. One drawback is that such vermiculite can be in short supply. Such vermiculite is one of the most important additives in the formulation of fire resistant gypsum wallboard, such as ULX and ULIX (ultralight board). Typical commercial products are USG SHEETROCK® brand Firecode C and Firecode X panels.

Some fire-resistant board is considered "fire-rated" when the board passes certain tests while in an assembly of wallboards affixed to studs. The fire-ratings relate to the assembly passing certain tests, including certain tests of Underwriters Laboratories (UL), including UL tests U305, U419, and U423 (sometimes simply called UL 305, UL 419, and UL 423).

It will be appreciated that this background description has been created by the inventors to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of any embodiments of the disclosure to solve any specific problem noted herein.

BRIEF SUMMARY

The disclosure relates to gypsum board and a method of preparing gypsum board where the board exhibits enhanced fire resistance through the targeted use of intumescent material (e.g., expandable vermiculite, expandable graphite, perlite, or combinations thereof). In some embodiments, the board is fire rated when tested in an assembly as discussed herein.

The board comprises a set gypsum core sandwiched between face and back cover sheets (e.g., formed from paper). The board contains one or more skim coat layers and/or hard edges. For example, a face skim coat layer can be included between the core and the face paper, while a back skim coat layer can be included between the core and the back paper. As understood in the art, typically the face side of the board is visible when hanging in use while the back side is not visible as it faces studs or other structural support. The intumescent material is expandable in embodiments of the disclosure as described herein.

The hard edges can be formed on the ends of the board and are typically generally disposed on either end of the core as known in the art and shown in FIGS. 1A-1B discussed below. Conventionally, boards have been prepared using a more uniform distribution of fire resistant additives throughout the board. Surprisingly and unexpectedly, the inventors have found that the desired enhanced fire resistance can be achieved by more heavily concentrating the intumescent material in the skim coat (preferably at least the back skim coat layer) and/or hard edges. In some embodiments, the intumescent material is included in a higher relative concentration in the back skim coat layer and/or hard edges as compared with the amount (if any) in the board core and/or the face skim coat layer. Amounts listed herein for ingredients in slurry are by weight of stucco unless otherwise stated. At some high temperatures (e.g., greater than about 1200° F.) some expandable intumescent materials can be oxidized and shrunk. The core of the board contains the largest bulk of gypsum and the heat sink property of the board can shield or protect the back skim coat layer from the excessive temperatures. As a result, the back side of the board is often subjected to lower temperatures and thus it has been found that locating the intumescent material in the back skim coat layer has been found to be desired in some embodiments. However, if desired the intumescent material can be concentrated in the face skim coat layer as an alternative or in addition to the concentration in the back skim coat and/or edge slurries. Concentrating the intumescent material in one or both edges is desired in some embodiments to minimize shrinkage between boards in a system (assembly) of multiple boards. In this regard, in a fire, the joint between edges of boards may open due to the shrinkage of each board. In some embodiments, including the expandable intumescent material in the edges can reduce the opening size between edges of two boards. Since the intumescent material is focused in these aforesaid areas of the board, advantageously, in preferred embodiments, the board can be made by using less total intumescent material such that the board can be made more economically and efficiently.

Thus, in one aspect, the disclosure provides a gypsum board having a board core disposed between face and back cover sheets. The core comprises set gypsum formed from a core slurry comprising water, stucco, and optional ingredients such as core intumescent material and other ingredients including the non-exclusive ingredients as described herein. The core also comprises a back skim coat layer defining first and second skim coat faces. The back skim coat is formed from a back skim coat slurry comprising water, the stucco, and a skim coat intumescent material. As referred to herein, the intumescent materials can be expandable, for example, perlite, expandable vermiculite, expandable graphite, or any combination thereof. The skim coat and core intumescent materials can contain the same or different ingredients, but either way, the skim coat intumescent material is provided in a higher relative amount as compared with the core intumescent material (if any). The back skim coat is disposed in bonding relation to the core where the first face of the skim coat layer faces the back cover sheet, and the second face of the skim coat layer faces the board core. Optionally, if desired, a face skim coat layer can be disposed between the core and the face cover sheet. If the face skim coat layer is included, the slurry for forming it can optionally include the skim coat intumescent material, and the face skim coat slurry and the back skim coat slurry can be the same or different. Hard opposing edges can optionally be formed, e.g., continuously from the face and/or back skim coat slurries. If present, in some embodiments, the hard edges can optionally include an edge intumescent material which has the same desired properties as the skim coat intumescent material. Preferably, as referred to herein, the hard edges and skim coat have a higher density and/or average hardness in accordance with ASTM 473-10, method B as compared with the core.

The gypsum board described herein desirably meets at least one of the following tests (a)-(e): (a) a High Temperature Shrinkage (S) of about 10% or less in the z direction when heated to about 1560° F. (850° C.), according to ASTM C1795-15; (b) a High Temperature Shrinkage (S) of about 10% or less in the x-y directions (width-length) when heated to about 1560° F. (850° C.) according to ASTM C1795-15; (c) a Thermal Insulation Index (TI) of about 20 minutes or greater according to ASTM C1795-15; (d) a High Temperature Thickness Expansion in the z direction of from about 0.1% to about 20% (e.g., from about 0.1% to about 15%, from about 0.1% to about 10%, from about 0.1% to about 5%, etc.) when thickness is evaluated according to the analogous techniques and methodology of ASTM C1795-15; and/or (e) where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes. In various embodiments, the board passes at least two of the tests, at least three of the tests, at least four of the tests, or all five tests.

In another aspect, the disclosure provides a gypsum board comprising face and back cover sheets and a board core disposed therebetween. The core comprises set gypsum formed from a core slurry comprising water, stucco, and other ingredients as desired, including non-exclusive ingredients described herein such as core intumescent material. The core defines first and second core faces. Two opposing hard edges are disposed on either end of the core and are formed from an edge slurry containing water, stucco, and edge intumescent material. In some embodiments, the board is formed to have face and/or back skim coat layers as described herein. The face and back skim coat layers are formed from the same or different skim coat slurries. If desired, in some embodiments, the edge slurry is divided from one or both skim coat slurries. Edge intumescent material has the same desired characteristics as skim coat intumescent material (particularly, higher concentration in the slurry than the concentration of the intumescent material in the core slurry). Thus, in some embodiments, where the back and/or face skim coat slurry contains the skim coat intumescent material, the edge slurry can be the same as one or both skim coat slurries with the same amount of intumescent material in the edge and one or both skim coat slurries, respectively. The edge slurry can be divided from a skim coat slurry from which it is derived, e.g., by directing the slurry around a roller for applying the (e.g., face) skim coat thereby directing the divided slurry to the lateral ends of the board to form the edges. For example, in some embodiments, the intumescent material can be added directly (e.g., as a powder) into the edge slurry, e.g., after it has been divided from the face and/or back skim coat slurry (e.g., by passing it around a skim coat roller as discussed herein). Thus, in some embodiments, the edge slurry can have edge intumescent material and the skim coat layers, if any, are not formed from skim coat intumescent material. The gypsum board desirably meets at least one of the foregoing tests (a)-(e). In various embodiments, the board passes at least two of the tests, at least three of the tests, at least four of the tests, or all five tests.

In another aspect, the disclosure provides a gypsum board comprising a board core comprising set gypsum formed from a core slurry comprising water, stucco, and optionally other ingredients as desired including non-exclusive ingredients described herein such as core intumescent material. The board core is disposed between face and back cover sheets. A back skim coat layer is formed from a back skim coat slurry comprising water, the stucco, and a skim coat intumescent material. The back skim coat layer defines first and second back skim coat faces and is disposed in bonding relation to the core. The first face of the back skim coat layer faces the back cover sheet, and the second face of the back skim coat layer faces the board core. A face skim coat is formed from a face skim coat slurry comprising water, the stucco, and an optional skim coat intumescent material. The face skim coat slurry can be the same or different as the back skim coat slurry. The face skim coat layer defines first and second face skim coat faces. The face skim coat is disposed in bonding relation to the core. The first face of the face skim coat layer faces the face cover sheet, and the second face of the face skim coat layer faces the board core. The back skim coat slurry and the face skim coat slurry can be the same or different. Two opposing hard edges disposed on either end of the core are formed from an edge slurry containing water, stucco, and edge intumescent material. The edge slurry can be the same or different from each of the back skim coat slurry and the face skim coat slurry. The gypsum board desirably meets at least one of the foregoing tests (a)-(e). In various embodiments, the board passes at least two of the tests, at least three of the tests, at least four of the tests, or all five tests.

In another aspect, the disclosure provides a method of making gypsum board. The method comprises mixing at least water, stucco, and optionally other ingredients as described including non-exclusive ingredients as described herein, such as core intumescent material, to form a core slurry. The core slurry is applied in a bonding relation to a face cover sheet to form a face composite having a core slurry surface and a paper surface. At least water, stucco, and a skim coat intumescent material are mixed to form a back skim coat slurry. The back skim coat slurry is applied in a bonding relation to a back cover sheet to form a back composite having a skim coat slurry surface and a paper surface. Optionally, if desired, a face skim coat layer can be disposed between the core and the face cover sheet. If the face skim coat layer is included, the slurry for forming it can optionally include the skim coat intumescent material, and the face skim coat slurry and the back skim coat slurry can be the same or different. Hard opposing edges can optionally be formed, e.g., continuously from the face and/or back skim coat slurries. If present, the hard edges can include an edge intumescent material. The back composite is applied in a bonding relation to the face composite to form a board precursor, wherein the back skim coat slurry surface faces the face core slurry surface. The board precursor is dried to form the gypsum board. The gypsum board desirably meets at least one of the foregoing tests (a)-(e). In various embodiments, the board passes at least two of the tests, at least three of the tests, at least four of the tests, or all five tests.

In another aspect, the disclosure provides a method of making gypsum board, the method comprising mixing at least water, stucco, and optionally other ingredients as desired including non-exclusive ingredients described herein, such as core intumescent material, to form a core slurry. The core slurry is applied to a face cover sheet to form a face composite having a core slurry surface and a paper surface. The core slurry forms a core in bonding relation to the face cover sheet. At least water, stucco, and an edge intumescent material are mixed to form an edge slurry. The edge slurry is applied in a manner that it forms two edges, with one edge on either end of the core. In some embodiments, the board is formed to have face and/or back skim coat layers as described herein. The face and back skim coat layers are formed from the same or different skim coat slurries. If desired, in some embodiments, the edge slurry is divided from one or both skim coat slurries. A back cover sheet is applied to the face composite to form a board precursor. The back cover sheet faces the core slurry surface of the face composite. The board precursor is dried to form the gypsum board. The gypsum board desirably meets at least one of the foregoing tests (a)-(e). In various embodiments, the board passes at least two of the tests, at least three of the tests, at least four of the tests, or all five tests.

In another aspect, the disclosure provides a method of making gypsum board. The method comprises mixing at least water, stucco, and core intumescent material to form a core slurry. At least water, stucco, an optional skim coat intumescent material, and other ingredients as desired including non-exhaustive ingredients described herein, are mixed to form a face skim coat slurry. The face skim coat slurry is applied to a face cover sheet and the core slurry is applied over the face skim coat slurry, as disposed on the face cover sheet, to form a face composite having a core slurry surface and a paper surface. At least water, stucco, and a skim coat intumescent material are mixed to form a back skim coat slurry. The face skim coat slurry and back skim coat slurry can be the same or different. The back skim coat slurry is applied in a bonding relation to a back cover sheet to form a back composite having a skim coat slurry surface and a paper surface. Hard edges are formed on either end of the core slurry. The edges are formed from the face skim coat slurry and/or the back skim coat slurry. The back composite is applied in a bonding relation to the face composite to form a board precursor. The back skim coat slurry surface faces the core slurry surface. The edges are generally continuous from the applied face skim coat or back skim coat. The board precursor is dried to form the gypsum board. The gypsum board desirably meets at least one of the foregoing tests (a)-(e). In various embodiments, the board passes at least two of the tests, at least three of the tests, at least four of the tests, or all five tests.

It will be understood that the preceding aspects are not limited by the descriptions above. Sub-aspects are described in the Detailed Description below, taken with the figures and examples, etc. It will be further understood that various sub-aspects including components, ingredient types, amounts, and properties, as well as other parameters, ranges, and other details described herein are fully contemplated in connection with the aspects above and they can be incorporated as desired into the aspects of the preceding paragraphs unless directly contradicted or expressly excluded.

BRIEF DESCRIPTION OF THE SEVERAL VIEWS OF THE DRAWING(S)

FIG. 1A is a schematic illustration (not drawn to scale) of a cross-sectional view of a gypsum board with a skim coat layer with the hard edges formed continuously from a face skim coat layer in accordance with embodiments of the disclosure.

FIG. 1B is a schematic illustration (not drawn to scale) of a cross-sectional view of a gypsum board with a skim coat layer with the hard edges formed continuously form a back skim coat layer in accordance with embodiments of the disclosure.

DETAILED DESCRIPTION

Figure 2:
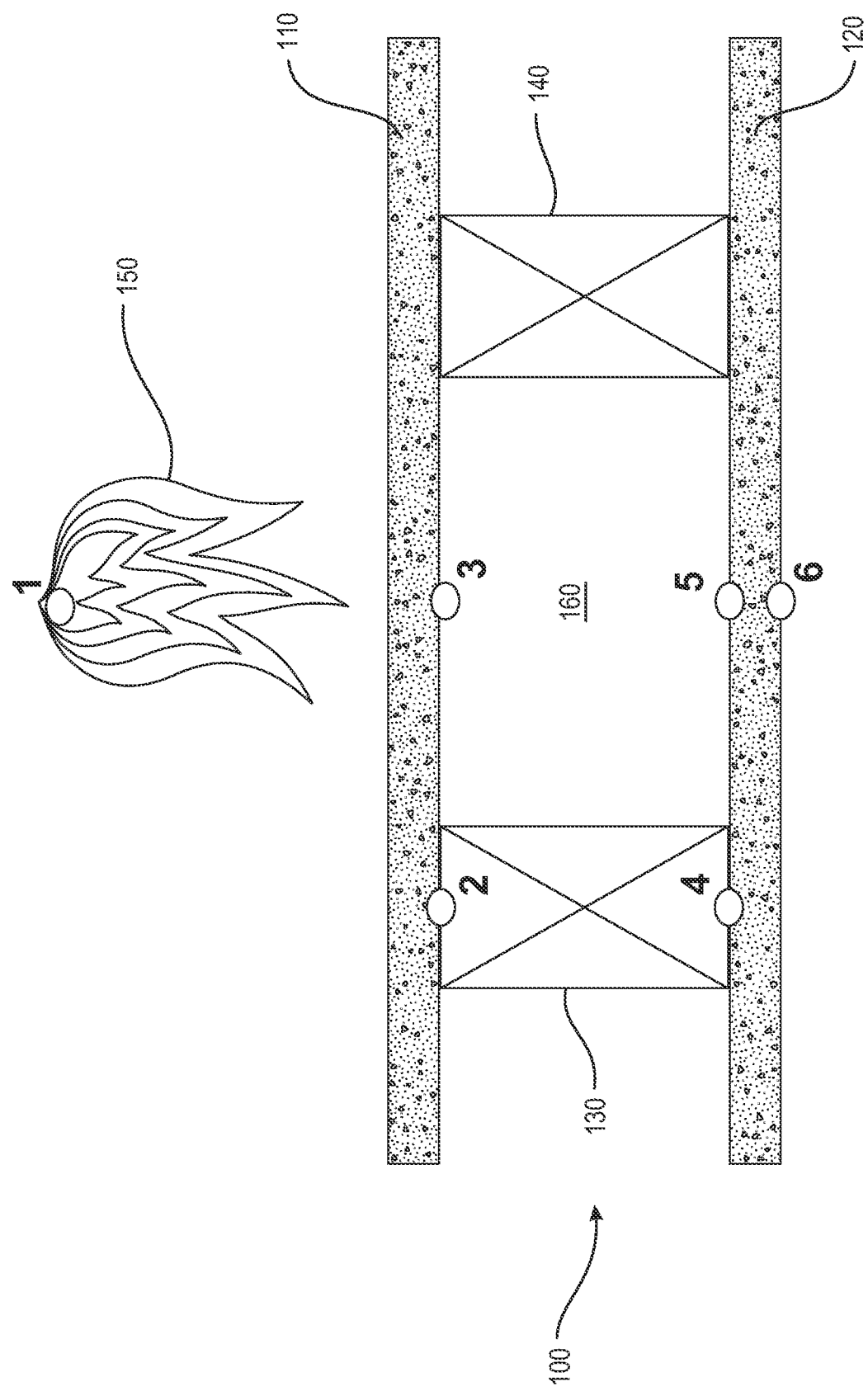
FIG. 2 is a schematic illustration of a full-scale assembly with thermocouple locations as discussed in Example 1.

Embodiments of the disclosure provide a gypsum board that exhibits fire resistance, as well as related methods. It will be understood that the term "wallboard" includes the use of such board on surfaces other than walls, such as ceilings or other desired end-uses. The gypsum board includes a core sandwiched between face and back cover sheets. Preferably, the board includes a face skim coat layer between the core and the face cover sheet and a back skim coat layer between the core and the back cover sheet. Hard edges can also be provided. The core is formed from a core stucco slurry and the skim coat and hard edges are formed from stucco slurries designed to have higher density and/or greater hardness than the core. The stucco slurries contain water, stucco, and other ingredients as desired, as discussed herein.

In preferred embodiments, the skim coat layers generally have higher density and are very thin relative to the board core. The layer forming the board core is the primary gypsum layer since it is the largest contributor to thickness of the gypsum layers cumulatively, and to the board as a whole. The set gypsum core makes up a substantial thickness (e.g., at least about 90%, at least about 92%, at least about 95%, or at least about 97%) of the total thickness of all the gypsum layers. In some embodiments the first and/or second skim coat layer has a dry thickness of from about 0.125 inches (⅛ inch) to about 0.016 inches (1/64 inch). In preferred embodiments, at least one skim coat layer (preferably the skim coat layer adjacent to the back cover sheet) has a thickness of from about 0.125 inches to about 0.04 inches, such as from about 0.125 inches to about 0.08 inches, from about 0.10 inches to about 0.08 inches, from about 0.09 inches to about 0.04 inches, from about 0.08 inches to about 0.04 inches, from about 0.07 inches to about 0.04 inches, from about 0.06 inches to about 0.04 inches, from about 0.05 inches to about 0.04 inches, from about 0.167 inches to about 0.016 inches.

To achieve fire resistance beyond what is found in conventional wallboard, skim coat or edge intumescent material is used in the stucco slurry for forming back skim coat and/or hard edges in accordance with preferred embodiments. The skim coat and edge intumescent material have the same desired characteristic, particularly being present in a higher concentration in its respective slurry than the core intumescent material is present in the core slurry. In some embodiments, the back skim coat layer includes the skim coat intumescent material. For example, in some embodiments, the face skim coat and edge slurry (which can optionally be the same) are free of the intumescent material while it is present in the back skim coat layer. In such embodiments, if desired, the edges can be formed continuously from the face skim coat. In accordance with some embodiments, some fire resistant board is considered "fire rated" when the board passes certain tests while in an assembly, as discussed below.

To illustrate, FIGS. 1A-1B schematically depict embodiments of the disclosure where a composite gypsum board 10 is shown. The board 10 has a core 12 sandwiched between face paper 14 and back paper 16. As shown in FIGS. 1A and 1B, the board 10 can include a face skim coat layer 18 and a back skim coat layer 20. Edges 22 and 24 are typically hard and can be formed on either end of the core 12 as seen in FIGS. 1A and 1B. Edges 22 and 24 can be formed continuously from either of the skim coat layers 18 and 20 in some embodiments. For example, during manufacture, a skim coat roller (e.g., for applying the face skim coat to face paper) as known in the art can be configured to have a width smaller than the width of the board so that skim coat slurry wraps around the roller and forms the edges. As shown in FIG. 1A, the edges 22 and 24 are formed continuously from the face skim coat layer 18. Alternatively, in FIG. 1B, the edges 22 and 24 are formed continuously from the back skim coat layer 20. The edges 22 and 24 form the lateral ends ("edges") of the board 10. However, the edges can be formed separately from a different slurry than the skim coat slurry or slurries if desired. The core 12 of the board is interposed between the two edges, 22 and 24. The inclusion of hard edges in gypsum wallboard is known, e.g., for durability for handling and prevention from overdrying in the kiln. In some embodiments, the edges can be tapered on the face side as shown in FIGS. 1A and 1B, e.g., where a terminal portion of the edge may be thinner than the core 12. In such embodiments, when two boards abut in use, a recess or valley is formed so that joint compound and tape can be embedded to facilitate a planar finish.

If desired, the face of the board can be painted or otherwise decorated while the back of the board normally is not decorated since it is not visible as it faces supports when in use. The board 10 can be included in a wall system (assembly) of multiple boards and supports (e.g., studs). As the boards are affixed to supports with the face side being visible, the boards abut each other with a joint in between. Joint tape and joint compound as known in the art are used to fill the joint between the boards and create a planar surface. The back side of the boards and the studs can face a cavity which can optionally be provided with insulation material as known in the art. The face side in the system of boards can be painted or otherwise decorated to enhance the aesthetics of the wall system.

In some embodiments as discussed herein, the back skim coat layer and/or at least one edge contains skim coat intumescent material or edge intumescent material, respectively, while the face skim coat layer and the core have reduced amounts or no intumescent material. As defined herein, the edge and skim coat intumescent materials are provided in greater amount by weight of stucco as compared with the core intumescent material which indicates a lower relative amount (on a percentage basis, not in terms of total raw weight since the core is proportionally much larger than a skim coat or an edge).

In some embodiments, the core, skim coat, and/or edge intumescent material contain expandable vermiculite. One advantage of expandable vermiculite is that it can continue to expand at higher temperatures than the expandable graphite. Above 1200° F. (650° C.), expandable graphite can begin to oxidize as the carbon of the graphite reacts with oxygen and produces carbon dioxide. The board may shrink as this oxidation reaction occurs. As such, some cracking can occur above 1200° F. (650° C.) such that fire can pass through the board through the cracks. The expandable vermiculite can be included to provide additional fire resistance properties such as at particularly elevated temperatures (e.g., above 1200° F. (650° C.)). In some embodiments, expandable graphite is included in combination with expandable vermiculite such that less quantities of the expandable vermiculite is required than what would be used for vermiculite alone.

Expandable vermiculite (sometimes referred to as unexpanded vermiculite) is described in, e.g., U.S. Pat. No. 8,323,785, which discussion is incorporated by reference herein. Any suitable type of expandable vermiculite can be included. Expandable vermiculite in some embodiments is a high expansion vermiculite. High expansion vermiculite particles have a volume expansion after heating for one hour at about 1560° F. (about 850° C.) of about 300% or more of their original volume. One such high expansion vermiculite is often referred to as Grade No. 4 unexpanded vermiculite (U.S. grading system). In some embodiments, at least about 50% of the particles in the high expansion vermiculite used in gypsum board formed according to principles of the present disclosure will be larger than about 50 mesh (i.e., greater than about 0.0117 inch (0.297 mm) openings). In other embodiments, at least about 70% of the particles will be larger than about 70 mesh (i.e., larger than about 0.0083 inch (0.210 mm) openings).

Other particulates with properties comparable to high expansion vermiculite may be included in the gypsum slurry along with the expandable graphite. In some embodiments, high expansion vermiculites can be used that have a volume expansion of about 300% to about 380% of their original volume after being placed for one hour in a chamber having a temperature of about 1560° F. (about 850° C.).

In other embodiments, high expansion vermiculites can be used that are classified under different and/or foreign grading systems. Such high expansion vermiculites should have substantially similar expansion and/or thermal resistance characteristics typical of those discussed herein. For example, in some embodiments, a vermiculite classified as European, South American, or South African Grade 0 (micron) or Grade 1 (superfine) can be used with the expandable graphite to assist imparting fire resistance to the gypsum board.

If desired, in some embodiments, a Grade No. 5 unexpanded vermiculite can be included in the gypsum slurry, although more material is generally required than if Grade No. 4 is used since Grade No. 5 exhibits less expansion. The No. 5 unexpanded vermiculite typically has a volume expansion at about 1560° F. (about 850° C.) of about 225%. In some embodiments, the vermiculite is in the form of a mixture of Grade Nos. 3/4/5 unexpanded vermiculite, which typically has a volume expansion at about 1560° F. (about 850° C.) of about 380%. The blend can include, for example, from about 25 wt. % to about 35 wt. % Grade No. 3, from about 30 wt. % to about 45 wt. % Grade No. 4, and from about 20 wt. % to about 40% wt. % Grade No. 5. To illustrate, in one embodiment, a mixture of Grade Nos. 3/4/5 unexpanded vermiculite can contain, e.g., a weight ratio of 33.3 wt. % Grade 3, 33.3 wt. % Grade 4, and 33.3 wt. % Grade 5.

In accordance with embodiments of the disclosure, inclusion of the expandable graphite imparts added fire resistance property to the set gypsum layer in the gypsum board, while allowing for reduction of the use of expandable vermiculite, or, in some embodiments, elimination of the expandable vermiculite. The set gypsum layer formed from a gypsum slurry that includes the expandable graphite has a fire resistance greater than an equivalent set gypsum layer formed from a slurry that does not include the expandable graphite.

Expandable graphite is a form of carbon, and generally contains multiple layers of carbon. Surprisingly and unexpectedly, expandable graphite provides a significant benefit in fire resistant board as the expandable graphite expands considerably upon heating. In this regard, while expandable graphite is stable at room temperatures, the expandable graphite expands. This expansion is beneficial because it can compensate for the shrinkage of the board, e.g., because the gypsum shrinks as the dihydrate molecules associated with the calcium sulfate in the gypsum molecules become dehydrated as the gypsum is calcinated upon exposure to heat. The shrinkage is undesirable because cracks in the board will form, thereby allowing fire to travel through the board.

In some embodiments, the expandable graphite exhibits a volume expansion of at least about two times of its original volume after being heated for one hour at about 1110° F. (600° C.). For example, in some embodiments, the expandable graphite expands by a factor of at least about 10 times its original volume, e.g., from about two times to about 1000 times, such as from about two times to about 750 times, from about two times to about 500 times, from about two times to about 250 times, from about two times to about 100 times, from about two times to about 50 times, from about 10 times to about 1000 times, from about 20 times to about 700 times, from about 30 times to about 500 times, from about 40 times to about 300 times, from about 50 times to about 200 times, etc.

In some embodiments, the expandable graphite is selected because it expands upon heating to a greater degree than vermiculite expands. Accordingly, less expandable graphite ca be used than amounts of unexpanded vermiculite in some embodiments. The amount of unexpanded vermiculite can thus be reduced or eliminated in some embodiments. By using expandable graphite, the total amount of intumescent material, can be reduced, which further saves on expense and resources.

Different expandable graphite materials vary depending on the particle size, expansion onset temperature, density, and surface chemistry (e.g., positive, negative, or neutral) of the expanded graphite material. Since expandable graphite has a layered structure, it is possible to include certain chemicals (e.g., an intercalating agent) between the layers in order to decompose and volatilize to cause the graphite to expand upon heating as known in the art. For example, U.S. Pat. No. 6,669,919 describes various chemicals that can be placed between the layers of the expandable graphite. These chemicals include, but are not limited to, sulfuric acid, nitric acid, formic acid, oxalic acid, fumaric acid, malonic acid, maleic acid, succinic acid, glutaric acid, adipic acid, or any combination thereof.

While not wishing to be bound by any particular theory, it is believed that the expansion for a graphite material occurs at a particular onset temperature. At the onset temperature, it is believed that the molecules of intercalating agent begin to decompose and volatilize such that the graphite layer starts to expand. Prior to heating or expansion, the layers of the expandable graphite are bonded in flat layered planes with weaker bonds between the planes, while after expansion, the layers of the expandable graphite generally have minimal or no chemical or physical bonds.

The expandable graphite can have any suitable expansion onset temperature. For example, in some embodiments, the expandable graphite has an onset temperature of from about 220° F. (104° C.) to about 750° F. (400° C.), e.g., from about 250° F. (120° C.) to about 750° F. (400° C.), from about 250° F. (120° C.) to about 660° F. (350° C.), from about 300° F. (150° C.) to about 450° F. (300° C.), from about 300° F. (150° C.) to about 540° F. (280° C.), from about 320° F. (160° C.) to about 480° F. (250° C.), or from about 360° F. (180° C.) to about 480° F. (250° C.), etc.

The expandable graphite can have any suitable particle size. For example, in some embodiments, the expandable graphite has an average particle size of from about 5 mesh to about 400 mesh, e.g., from about 5 mesh to about 270 mesh, from about 20 mesh to about 200 mesh, from about 20 mesh to about 140 mesh, from about 35 mesh to about 100 mesh, or from about 50 mesh to about 80 mesh, about 40 mesh to about 60 mesh, about 45 mesh to about 55 mesh, etc. In some embodiments, the mean particle size is about 50 mesh. The mesh size can be determined, for example, by sieves and particle size analyzer. Preferably, a desired pH range for the expanded graphite particles is from about 4.0 to about 8.5. In some embodiments, the expandable graphite has a substantially neutral surface chemistry, e.g., from about 5.5 to about 8.5, from about 6 to about 8, from about 6.5 to about 7.5, from about 6.7 to about 7.3 (e.g., about 7), etc.

The expandable graphite can have any suitable density. For example, in some embodiments, the expandable graphite has a density of from about 20 pcf to about 120 pcf, e.g., from about 20 pcf to about 100 pcf, from about 20 pcf to about 90 pcf, from about 20 pcf to about 85 pcf, from about 20 pcf to about 70 pcf, from about 20 pcf to about 45 pcf, from about 30 pcf to about 120 pcf, from about 30 pcf to about 100 pcf, from about 30 pcf to about 90 pcf, from about 30 pcf to about 85 pcf, from about 30 pcf to about 70 pcf, from about 30 pcf to about 45 pcf, from about 50 pcf to about 75 pcf, from about 50 to about 65 pcf, etc.

Examples of commercially available expandable graphite products include GRAFGUARD 160-50N, having an onset temperature of 320° F. (160° C.), a mesh size of 50, and a neutral surface chemistry; as well as GRAFGUARD 220-50N, having an onset temperature of 430° F. (220° C.), a mesh size of 50, and a neutral surface chemistry; GRAFGUARD 220-80N, having an onset temperature of 430° F. (220° C.), a mesh size of 80, and a neutral surface chemistry; GRAFGUARD 250-50N, having an onset temperature of 480° F. (250° C.), a mesh size of 50, and a neutral surface chemistry. The GRAFGUARD products are commercially available from GrafTech International, Independence, Ohio.

The skim coat and edge intumescent material on one hand can be distinguished from the core intumescent material on the other hand by the increased relative amount of intumescent material in the slurries for forming the skim coat(s) and/or edges as compared with the relative amounts of core intumescent material used in the core slurry. While the relative amounts of skim coat and/or edge intumescent material is higher than that of the core intumescent material, the core intumescent material can have a higher gross amount since the core is much larger (e.g., in weight and thickness) as compared with the skim coat(s) or edges.

Any suitable amount of intumescent material can be used in the core, skim coat(s), and edges. For example, in some embodiments the core intumescent material is present in the core slurry in an amount of from about 1% to about 5% by weight of the stucco, such as from about 2% to about 4% by weight of the stucco.

In some embodiments, the skim coat intumescent material is present in the back skim coat slurry and/or face skim coat slurry in an amount of from about 2% to about 20% by weight of the stucco, such as from about 4% to about 15% by weight of the stucco. In some embodiments, the edge intumescent material is present in the edge slurry in an amount of from about 3% to about 20% by weight of the stucco, such as from about 4% to about 15% by weight of the stucco.

In some embodiments, the core intumescent material is present in the core slurry in an amount of from about 1% to about 5% by weight of the stucco, such as from about 2% to about 4% by weight of the stucco; the skim coat intumescent material is present in the back skim coat slurry and/or face skim coat slurry in an amount of from about 2% to about 20% by weight of the stucco, such as from about 4% to about 15% by weight of the stucco; and/or the edge intumescent material is present in the edge slurry in an amount of from about 3% to about 20% by weight of the stucco, such as from about 4% to about 15% by weight of the stucco.

A weight ratio between the amount of intumescent material in the core vs. the skim coat layers and edges can be calculated by determining the ratio of the intumescent material percentage to the stucco in the core and the intumescent material percentage to the stucco in the skim/edge coat. For example, in some embodiments, the weight ratio between the core intumescent material and the skim coat intumescent material is from about 1:1.2 to about 1:4, such as from about 1:1.5 to about 1:2.5. In some embodiments, the weight ratio between the core intumescent material and the edge intumescent material is from about 1:1.5 to about 1:4, such as from about 1:2 to about 1:3. In some embodiments, the weight ratio between the core intumescent material and the skim coat intumescent material is from about 1:1.2 to about 1:4, such as from about 1:1.5 to about 1:2.5 and the weight ratio between the core intumescent material and the edge intumescent material is from about 1:1.5 to about 1:4, such as from about 1:2 to about 1:3.

In some embodiments, additional fire resistant additives optionally can be included in the gypsum slurry for forming the board, including non-expanding materials. For example, the additional fire resistant additives can include fiber, e.g., glass fiber, carbon fiber, or mineral fiber; alumina trihydrate (ATH); and the like. Fiber can be beneficial because it helps to improve board integrity. ATH can provide flame retardance and is further beneficial because its heat absorption capacity is higher than that of gypsum. If included, these additives can be present in the gypsum slurry in an amount of from about 0% to about 20% by weight of the stucco, e.g., from about 0% to about 15% by weight of stucco, from about 0% to about 10% by weight of stucco, from about 1% to about 8% by weight of stucco, etc.

A gypsum slurry (sometimes called a stucco slurry) is used to prepare one or more gypsum layers in the composite board. Normally, the composite board contains a primary gypsum layer, often referred to as a core, sandwiched between the face and back cover sheets. In some embodiments, a skim coat is disposed between the core and one or both cover sheets. In some embodiments, a concentrated layer (as described in U.S. patent application Ser. Nos. 15/186,176, 15/186,212, 15/186,232, and 15/186,257) is provided between the so-called gypsum core and one or both of the cover sheets. The gypsum slurry includes water and stucco, as well as other optional ingredients as desired.

Any suitable type of stucco can be used in the gypsum slurry, including calcium sulfate alpha hemihydrate, calcium sulfate beta hemihydrate, and calcium sulfate anhydrate. The stucco can be fibrous or non-fibrous. Embodiments of the disclosure can accommodate any suitable water-to-stucco ratio (WSR). In some embodiments, the WSR is from about 0.3 to about 1.5, such as, for example, from about 0.3 to about 1.3, from about 0.3 to about 1.2, from about 0.3 to about 1, from about 0.3 to about 0.8, from about 0.5 to about 1.5, from about 0.5 to about 1.3, from about 0.5 to about 1.2, from about 0.5 to about 1, from about 0.5 to about 0.8, from about 0.7 to about 1.5, from about 0.7 to about 1.3, from about 0.7 to about 1.2, from about 0.7 to about 1, from about 0.8 to about 1.5, from about 0.8 to about 1.3, from about 0.8 to about 1.2, from about 0.8 to about 1, from about 0.9 to about 1.5, from about 0.9 to about 1.3, from about 0.9 to about 1.2, from about 1 to about 1.5, from about 1 to about 1.4, from about 1 to about 1.2, etc.

The gypsum slurry can include accelerators or retarders as known in the art to adjust the rate of setting if desired. Accelerators can be in various forms (e.g., wet gypsum accelerator, heat resistant accelerator, and climate stabilized accelerator). See, e.g., U.S. Pat. Nos. 3,573,947 and 6,409,825. In some embodiments where accelerator and/or retarder are included, the accelerator and/or retarder each can be in the stucco slurry for forming the board core in an amount on a solid basis of, such as, from about 0% to about 10% by weight of the stucco (e.g., about 0.1% to about 10%), such as, for example, from about 0% to about 5% by weight of the stucco (e.g., about 0.1% to about 5%).

Other optional additives can be included in the gypsum slurry to provide desired properties, including green strength, sag resistance, water resistance, mold resistance, fire rating, thermal properties, board strength, etc. Non-exclusive examples of suitable additives include, for example, dispersant, strength additives such as starch, polyphosphate, high expansion particulate, heat sink additive, fibers, siloxane, magnesium oxide, etc., or any combination thereof. These ingredients can be selected as desired in the various embodiments described herein. The use of the singular term additive herein is used for convenience but will be understood to encompass the plural, i.e., more than one additive in combination, as one of ordinary skill in the art will readily appreciate.

In some embodiments, the gypsum slurry optionally includes a starch that is effective to increase the strength of the gypsum board relative to the strength of the board without the starch (e.g., via increased nail pull resistance). Any suitable strength enhancing starch can be used, including hydroxyalkylated starches such as hydroxyethylated or hydroxypropylated starch, or a combination thereof, or pregelatinized starches, which are generally preferred over acid-modifying migrating starches which generally provide paper-core bond enhancement but not core strength enhancement. Any suitable pregelatinized starch can be included in the enhancing additive, as described in U.S. Patent Publications 2014/0113124 A1 and 2015/0010767 A1, including methods of preparation thereof and desired viscosity ranges described therein.

If included, the pregelatinized starch can exhibit any suitable viscosity. In some embodiments, the pregelatinized starch is a mid-range viscosity starch as measured according to the VMA method as known in the art and as set forth in U.S. Patent Publication 2014/0113124 A1, which VMA method is hereby incorporated by reference. Desirable pregelatinized starches in accordance with some embodiments can have a mid-range viscosity, e.g., according to the VMA method when measured in a 15 wt. % solution of starch in water, of from about 20 centipoise to about 700 centipoise, e.g., from about from about 20 centipoise to about 600 centipoise, from about 20 centipoise to about 500 centipoise, from about 20 centipoise to about 400 centipoise, from about 20 centipoise to about 300 centipoise, from about 20 centipoise to about 200 centipoise, from about 20 centipoise to about 100 centipoise, from about 30 centipoise to about 700 centipoise, from about 30 centipoise to about 600 centipoise, from about 30 centipoise to about 500 centipoise, from about 30 centipoise to about 400 centipoise, from about 30 centipoise to about 300 centipoise, from about 30 centipoise to about 200 centipoise, from about 30 centipoise to about 100 centipoise, from about 50 centipoise to about 700 centipoise, from about 50 centipoise to about 600 centipoise, from about 50 centipoise to about 500 centipoise, from about 50 centipoise to about 400 centipoise, from about 50 centipoise to about 300 centipoise, from about 50 centipoise to about 200 centipoise, from about 50 centipoise to about 100 centipoise, from about 70 centipoise to about 700 centipoise, from about 70 centipoise to about 600 centipoise, from about 70 centipoise to about 500 centipoise, from about 70 centipoise to about 400 centipoise, from about 70 centipoise to about 300 centipoise, from about 70 centipoise to about 200 centipoise, from about 70 centipoise to about 100 centipoise, from about 100 centipoise to about 700 centipoise, from about 100 centipoise to about 600 centipoise, from about 100 centipoise to about 500 centipoise, from about 100 centipoise to about 400 centipoise, from about 100 centipoise to about 300 centipoise, from about 100 centipoise to about 200 centipoise, etc. In accordance with some embodiments, the pregelatinized starch can be prepared as an extruded starch, e.g., where starch is prepared by pregelatinization and acid-modification in one step in an extruder as described in U.S. Patent Publication 2015/0010767 A1, which extrusion method is hereby incorporated by reference.

If included, the starch can be present in any suitable amount. In some embodiments, the starch is present in the gypsum slurry in an amount of from about 0% to about 20% by weight of the stucco, e.g., from about 0% to about 15% by weight of stucco, from about 0% to about 10% by weight of stucco, from about 0.1% to about 20% by weight of stucco, from about 0.1% to about 15% by weight of stucco, from about 0.1% to about 10% by weight of stucco, from about 0.1% to about 6% by weight of stucco, from about 0.3% to about 4% by weight of stucco, from about 0.5% to about 4% by weight of stucco, from about 0.5% to about 3% by weight of stucco, from about 0.5% to about 2% by weight of stucco, from about 1% to about 4% by weight of stucco, from about 1% to about 3% by weight of stucco, from about 1% to about 2% by weight of stucco, etc.

The gypsum slurry can optionally include at least one dispersant to enhance fluidity in some embodiments. The dispersants may be included in a dry form with other dry ingredients and/or in a liquid form with other liquid ingredients in stucco slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE111, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosulfonates or sulfonated lignin. Naphthalenesulfonate dispersants can be used to facilitate formation of larger bubbles and hence larger voids in the final product, and polycarboxylates such as polycarboxylate ethers can be used to form smaller bubbles and hence smaller voids in the product. As void structure changes to the product are desired during manufacture, such dispersant adjustments and other changes in the process can be made as one of ordinary skill will appreciate. Lignosulfonates are water-soluble anionic polyelectrolyte polymers, byproducts from the production of wood pulp using sulfite pulping. One example of a lignin useful in the practice of principles of embodiments of the present disclosure is Marasperse C-21 available from Reed Lignin Inc.

Lower molecular weight dispersants are generally preferred. Lower molecular weight naphthalenesulfonate dispersants are favored because they trend to a lower water demand than the higher viscosity, higher molecular weight dispersants. Thus, molecular weights from about 3,000 to about 10,000 (e.g., about 8,000 to about 10,000) are preferred. As another illustration, for PCE211 type dispersants, in some embodiments, the molecular weight can be from about 20,000 to about 60,000, which exhibit less retardation than dispersants having molecular weight above 60,000.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from GEO Specialty Chemicals, for example. Another example of naphthalenesulfonate is DAXAD, available from GEO Specialty Chemicals.

If included, the dispersant can be provided in any suitable amount. In some embodiments, for example, the dispersant is present in an amount, for example, from about 0% to about 0.7% by weight of stucco, 0% to about 0.4% by weight of stucco, from about 0.05% to about 5% by weight of the stucco, from about 0.05% to about 0.3% by weight of stucco, or from about 1% to about 5% by weight of stucco.

In some embodiments, the gypsum slurry can optionally include one or more phosphate-containing compounds, if desired. For example, phosphate-containing components useful in some embodiments include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate compositions if added in some embodiments can enhance green strength, resistance to permanent deformation (e.g., sag), dimensional stability, etc. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1,000-3,000 repeating phosphate units and having the molecular formula $(NH_4)_{n+2}P_nO_{3n+1}$ wherein n=1,000-3,000, or polyphosphoric acid having two or more repeating phosphoric acid units and having the molecular formula $H_{n+2}P_nO_{3n+1}$ wherein n is two or more.

If included, the phosphate-containing compound can be present in any suitable amount. To illustrate, in some embodiments, the phosphate-containing compound can be present in an amount, for example, from about 0.01% to about 1%, e.g., from about 0.1% to about 1%, or from about 0.2% to about 0.4% by weight of the stucco.

A water resistance or mold resistance additive such as siloxane optionally can be included. If included, in some embodiments, the siloxane preferably is added in the form of an emulsion. The slurry is then shaped and dried under conditions which promote the polymerization of the siloxane to form a highly cross-linked silicone resin. A catalyst which promotes the polymerization of the siloxane to form a highly cross-linked silicone resin can be added to the gypsum slurry. As described in U.S. Pat. No. 7,811,685, magnesium oxide can be included to contribute to the catalysis and/or to the mold resistance and/or water resistance in some embodiments. If included, magnesium oxide, is present in any suitable amount, such as from about 0.02% to about 1.0%, e.g., from about 0.02% to about 0.04% by weight of stucco.

In some embodiments, solventless methyl hydrogen siloxane fluid sold under the name SILRES BS 94 by Wacker-Chemie GmbH (Munich, Germany) can be used as the siloxane. This product is a siloxane fluid containing no water or solvents. It is contemplated that from about 0.05% to about 1.5%, e.g., from about 0.07% to about 0.14%, of the BS 94 siloxane may be used in some embodiments, based on the weight of the stucco. For example, in some embodiments, it is preferred to use from about 0.05% to about 0.5%, e.g., from about 0.09% to about 0.12% of the siloxane based on the dry stucco weight.

Any suitable foaming agent composition useful for generating foam in gypsum slurries can be utilized, e.g., in any core slurry described herein to make a core with lower density. Suitable foaming agents are selected to result in air voids in the final product such that the weight of the board core can be reduced. In some embodiments, the foaming agent comprises a stable soap, an unstable soap, or a combination of stable and unstable soaps. In some embodiments, one component of the foaming agent is a stable soap, and the other component is a combination of a stable soap and unstable soap. In some embodiments, the foaming agent comprises an alkyl sulfate surfactant.

Many commercially known foaming agents are available and can be used in accordance with embodiments of the disclosure, such as the HYONIC line (e.g., 25AS) of soap products from GEO Specialty Chemicals, Ambler, Pa. Other commercially available soaps include the Polystep B25, from Stepan Company, Northfield, Ill. The foaming agents described herein can be used alone or in combination with other foaming agents.

Some types of unstable soaps, in accordance with embodiments of the disclosure, are alkyl sulfate surfactants with varying chain length and varying cations. Suitable chain lengths, can be, for example, $C_8$-$C_{12}$, e.g., $C_8$-$C_{10}$, or $C_{10}$-$C_{12}$. Suitable cations include, for example, sodium, ammonium, magnesium, or potassium. Examples of unstable soaps include, for example, sodium dodecyl sulfate, magnesium dodecyl sulfate, sodium decyl sulfate, ammonium dodecyl sulfate, potassium dodecyl sulfate, potassium decyl sulfate, sodium octyl sulfate, magnesium decyl sulfate, ammonium decyl sulfate, blends thereof, and any combination thereof.

Some types of stable soaps, in accordance with embodiments of the disclosure, are alkoxylated (e.g., ethoxylated) alkyl sulfate surfactants with varying (generally longer) chain length and varying cations. Suitable chain lengths, can be, for example, $C_{10}$-$C_{14}$, e.g., $C_{12}$-$C_{14}$, or $C_{10}$-$C_{12}$. Suitable cations include, for example, sodium, ammonium, magnesium, or potassium. Examples of stable soaps include, for example, sodium laureth sulfate, potassium laureth sulfate, magnesium laureth sulfate, ammonium laureth sulfate, blends thereof, and any combination thereof. In some embodiments, any combination of stable and unstable soaps from these lists can be used.

Examples of combinations of foaming agents and their addition in preparation of foamed gypsum products are disclosed in U.S. Pat. No. 5,643,510, herein incorporated by reference. For example, a first foaming agent which forms a stable foam and a second foaming agent which forms an unstable foam can be combined. In some embodiments, the first foaming agent is a soap with an alkyl chain length of 8-12 carbon atoms and an alkoxy (e.g., ethoxy) group chain length of 1-4 units. The second foaming agent is optionally an unalkoxylated (e.g., unethoxylated) soap with an alkyl chain length of 6-20 carbon atoms, e.g., 6-18 carbon atoms or 6-16 carbon atoms. Regulating the respective amounts of these two soaps allows for control of the board foam structure until about 100% stable soap or about 100% unstable soap is reached.

In some embodiments, the foaming agent is in the form of an alkyl sulfate and/or alkyl ether sulfate. Such foaming agents are preferred over olefins such as olefin sulfates because the olefins contain double bonds, generally at the front of the molecule thereby making them undesirably more reactive, even when made to be a soap. Thus, preferably, the foaming agent comprises alkyl sulfate and/or alkyl ether sulfate but is essentially free of an olefin (e.g., olefin sulfate) and/or alkyne. Essentially free of olefin or alkyne means that the foaming agent contains either (i) 0 wt. % based on the weight of stucco, or no olefin and/or alkyne, or (ii) an ineffective or (iii) an immaterial amount of olefin and/or alkyne. An example of an ineffective amount is an amount below the threshold amount to achieve the intended purpose of using olefin and/or alkyne foaming agent, as one of ordinary skill in the art will appreciate. An immaterial amount may be, e.g., below about 0.001 wt. %, such as below about 0.005 wt. %, below about 0.001 wt. %, below about 0.0001 wt. %, etc., based on the weight of stucco, as one of ordinary skill in the art will appreciate.

The foaming agent is included in the gypsum slurry in any suitable amount. For example, in some embodiments, it is included in an amount of from about 0.01% to about 0.25% by weight of the stucco, e.g., from about 0.01% to about 0.1% by weight of the stucco, from about 0.01% to about 0.03% by weight of the stucco, or from about 0.07% to about 0.1% by weight of the stucco.

The cover sheets can be in any suitable form. It will be understood that, with respect to cover sheets, the terms "face" and "top" sheets are used interchangeably herein, while the terms "back" and "bottom" are likewise used interchangeably herein. For example, the cover sheets may comprise cellulosic fibers, glass fibers, ceramic fibers, mineral wool, or a combination of the aforementioned materials. One or both of the sheets may comprise individual sheets or multiple sheets. In preferred embodiments, the cover sheets comprise a cellulosic fiber. For example, paper sheet, such as Manila paper or kraft paper, can be used as the back sheet. Useful cover sheet paper includes Manila 7-ply and News-Line 3-ply, 5-ply, or 7-ply available from United States Gypsum Corporation, Chicago, Ill.; Grey-Back 3-ply and Manila Ivory 3-ply, available from International Paper, Newport, Ind.; and Manila heavy paper and MH Manila HT (high tensile) paper, available from United States Gypsum Corporation, Chicago, Ill.

In some embodiments, one or both sheets can comprise glass fibers, ceramic fibers, mineral wool, or a combination of the aforementioned materials. In other embodiments, the cover sheet can be "substantially free" of glass fibers ceramic fibers, mineral wool, or a mixture thereof, which means that the cover sheets contain either (i) 0 wt. % based on the weight of the sheet, or no such glass fibers ceramic fibers, mineral wool, or a mixture thereof, or (ii) an ineffective or (iii) an immaterial amount of glass fibers ceramic fibers, mineral wool, or a mixture thereof. An example of an ineffective amount is an amount below the threshold amount to achieve the intended purpose of using glass fibers ceramic fibers, mineral wool, or a mixture thereof, as one of ordinary skill in the art will appreciate. An immaterial amount may be, e.g., below about 5 wt. %, such as below about 2 wt. %, below about 1 wt. %, below about 0.5 wt. %, below about 0.2 wt. %, below about 0.1 wt. %, or below about 0.01 wt. % based on the weight stucco as one of ordinary skill in the art will appreciate. However, if desired in alternative embodiments, such ingredients can be included in the cover sheets.

In some embodiments, the thermal conductivity of the top and/or bottom sheet is less than about 0.1 w/(m.k.). For example, the thermal conductivity of the top and/or bottom sheet is less than about 0.05 w/(m.k.).

The cover sheets can also have any suitable total thickness. In some embodiments, at least one of the cover sheets has a relatively high thickness, e.g., a thickness of at least about 0.014 inches. In some embodiments, it is preferred that there is an even higher thickness, e.g., at least about 0.015 inches, at least about 0.016 inches, at least about 0.017 inches, at least about 0.018 inches, at least about 0.019 inches, at least about 0.020 inches, at least about 0.021 inches, at least about 0.022 inches, or at least about 0.023 inches. Any suitable upper limit for these ranges can be adopted, e.g., an upper end of the range of about 0.030 inches, about 0.027 inches, about 0.025 inches, about 0.024 inches, about 0.023 inches, about 0.022 inches, about 0.021 inches, about 0.020 inches, about 0.019 inches, about 0.018 inches, etc. The total sheet thickness refers to the sum of the thickness of each sheet attached to the gypsum board.

The cover sheets can have any suitable density. For example, in some embodiments, at least one or both of the cover sheets has a density of at least about 36 pcf, e.g., from about 36 pcf to about 46 pcf, such as from about 36 pcf to about 44 pcf, from about 36 pcf to about 42 pcf, from about 36 pcf to about 40 pcf, from about 38 pcf to about 46 pcf, from about 38 pcf to about 44 pcf, from about 38 pcf to about 42 pcf, etc.

The cover sheet can have any suitable weight. For example, in some embodiments, lower basis weight cover sheets (e.g., formed from paper) such as, for example, at least about 33 lbs/MSF (e.g., from about 33 lbs/MSF to about 65 lbs/MSF, from about 33 lbs/MSF to about 60 lbs/MSF, 33 lbs/MSF to about 58 lbs/MSF from about 33 lbs/MSF to about 55 lbs/MSF, from about 33 lbs/MSF to about 50 lbs/MSF, from about 33 lbs/MSF to about 45 lbs/MSF, etc., or less than about 45 lbs/MSF) can be utilized in some embodiments. In other embodiments, one or both cover sheets has a basis weight from about 38 lbs/MSF to about 65 lbs/MSF, from about 38 lbs/MSF to about 60 lbs/MSF, from about 38 lbs/MSF to about 58 lbs/MSF, from about 38 lbs/MSF to about 55 lbs/MSF, from about 38 lbs/MSF to about 50 lbs/MSF, from about 38 lbs/MSF to about 45 lbs/MSF, etc.

However, if desired, in some embodiments, even heavier basis weights can be used, e.g., to further enhance nail pull resistance or to enhance handling, e.g., to facilitate desirable "feel" characteristics for end-users. Thus, one or both of the cover sheets can have a basis weight of, for example, at least about 45 lbs/MSF (e.g., from about 45 lbs/MSF to about 65 lbs/MSF, from about 45 lbs/MSF to about 60 lbs/MSF, from about 45 lbs/MSF to about 55 lbs/MSF, from about 50 lbs/MSF to about 65 lbs/MSF, from about 50 lbs/MSF to about 60 lbs/MSF, etc.). If desired, in some embodiments, one cover sheet (e.g., the "face" paper side when installed) can have the aforementioned higher basis weight, e.g., to enhance nail pull resistance and handling, while the other cover sheet (e.g., the "back" sheet when the board is installed) can have somewhat lower weight basis if desired (e.g., weight basis of less than about 60 lbs/MSF, e.g., from about 33 lbs/MSF to about 55 lbs/MSF, from about 33 lbs/MSF to about 50 lbs/MSF, from about 33 lbs/MSF to about 45 lbs/MSF, from about 33 lbs/MSF to about 40 lbs/MSF, etc.).

Board weight is a function of the thickness of the board. Since boards are commonly made at varying thicknesses, board density is used herein as a measure of board weight. Examples of suitable nominal thickness include about ¼ inch, about ⅜ inch, about ½ inch, about ⅝ inch, about ¾ inch, or about one inch, and any range using any of the foregoing as endpoints. In some markets, the board can be formed at a nominal thickness according to metric measurements, e.g., about 9 mm, about 9.5 mm, about 10 mm, about 12 mm, about 12.5 mm, about 13 mm, about 15 mm, about 25 mm, and any range using any of the foregoing as endpoints. Properties referenced herein can be seen in board formed at one or more of the previously mentioned board thicknesses according to various embodiments. The advantages of the gypsum board in accordance with embodiments of the disclosure can be seen at a range of densities, including up to heavier board densities, e.g., about 43 pcf or less, or 40 pcf or less, such as from about 17 pcf to about 43 pcf, from about 20 pcf to about 43 pcf, from about 24 pcf to about 43 pcf, from about 27 pcf to about 43 pcf, from about 20 pcf to about 40 pcf, from about 24 pcf to about 40 pcf, from about 27 pcf to about 40 pcf, from about 20 pcf to about 37 pcf, from about 24 pcf to about 37 pcf, from about 27 pcf to about 37 pcf, from about 20 pcf to about 35 pcf, from about 24 pcf to about 35 pcf, from about 27 pcf to about 35 pcf, etc.

Product according to embodiments of the disclosure can be made on typical manufacturing lines. For example, board manufacturing techniques are described in, for example, U.S. Pat. No. 7,364,676 and U.S. Patent Application Publication 2010/0247937. Briefly, in the case of gypsum board, the process typically involves discharging a cover sheet onto a moving conveyor. Since gypsum board is normally formed "face down," this cover sheet is the "face" cover sheet in such embodiments.

Dry and/or wet components of the gypsum slurry are fed to a mixer (e.g., pin mixer or pin-less mixer), where they are agitated to form the gypsum slurry. The mixer comprises a main body and a discharge conduit (e.g., a gate-canister-boot arrangement as known in the art, or an arrangement as described in U.S. Pat. Nos. 6,494,609 and 6,874,930). In some embodiments, the discharge conduit can include a slurry distributor with either a single feed inlet or multiple feed inlets, such as those described in U.S. Patent Application Publication 2012/0168527 A1 (application Ser. No. 13/341,016) and U.S. Patent Application Publication 2012/0170403 A1 (application Ser. No. 13/341,209), for example. In those embodiments, using a slurry distributor with multiple feed inlets, the discharge conduit can include a suitable flow splitter, such as those described in U.S. Patent Application Publication 2012/0170403 A1. Foaming agent can be added in the discharge conduit of the mixer (e.g., in the gate as described, for example, in U.S. Pat. Nos. 5,683,635 and 6,494,609) or in the main body if desired. Slurry discharged from the discharge conduit after all ingredients have been added, including foaming agent, is the primary gypsum slurry and will form the board core. This board core slurry is discharged onto the moving face cover sheet.

The face cover sheet may bear a thin skim coat on its inner surface in the form of a relatively dense layer of gypsum slurry. Also, hard edges, as known in the art, can be formed, e.g., from the same slurry stream forming the face skim coat. In embodiments where foam is inserted into the discharge conduit, a stream of secondary gypsum slurry can be removed from the mixer body to form the dense skim coat slurry, which can then be used to form the face skim coat and hard edges as known in the art. If included, normally the face skim coat and hard edges are deposited onto the moving face cover sheet before the core slurry is deposited, usually upstream of the mixer. After being discharged from the discharge conduit, the core slurry is spread, as necessary, over the face cover sheet (optionally bearing skim coat) and covered with a second cover sheet (typically the "back" cover sheet) to form a wet assembly in the form of a sandwich structure that is a board precursor to the final product. The second cover sheet may optionally bear a second skim coat on its inner surface, which can be formed from the same or different secondary (dense) gypsum slurry as for the face skim coat, if present. The cover sheets may be formed from paper, fibrous mat or other type of material (e.g., foil, plastic, glass mat, non-woven material such as blend of cellulosic and inorganic filler, etc.).

In some single mixer embodiments, a skim coat stream can exit through a port and outlet in the main body of the mixer, i.e., upstream of the discharge conduit. The skim coat outlet is provided with one or more inlets to allow for introduction of the skim coat intumescent material and any other desired ingredients that vary from the board core slurry exiting the discharge conduit of the mixer. Where the foaming agent is inserted in the discharge conduit, the amount of foaming agent will be reduced or avoided in the skim coat stream since it is removed upstream of where the foaming agent is added, thereby allowing for an increased density in the skim coat layer as desired. If foaming agent is present in the skim coat stream, it can be beaten out by techniques known in the art. In preferred embodiments, the back skim coat layer is formed from the skim coat stream. The face skim coat layer also can be formed from the skim coat stream if desired. In some embodiments, however, the face skim coat layer can be formed from the slurry stream exiting the discharge conduit, which stream is also used to form the board core. Any foam therein can be beaten out if desired to increase the density of the face skim coat layer relative to the board core. The edge streams can be divided from the face and/or back skim coat streams. For example, in some embodiments, the face skim coat can be applied by a roller where some of the stream wraps around the roller and is directed to form each edge. Where the edge stream has different content of intumescent material than the skim coat slurry, dry intumescent material (e.g., as a powder) can be inserted into the edge stream after it is divided from the skim coat slurry. In multiple mixer arrangements, each mixer can be tailored as desired to produce the desired slurry components.

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln).

It also is common in the manufacture of gypsum board to use vibration in order to eliminate large voids or air pockets from the deposited slurry. Each of the above steps, as well as processes and equipment for performing such steps, are known in the art.

In some embodiments, the gypsum board can pass certain tests using a small scale bench test, in accordance with ASTM C1795-15, including high temperature shrinkage in the x-y directions (width-length), high temperature shrinkage (or even expansion) in the z-direction (thickness), and a Thermal Insulation Index (TI). Such bench tests are suitable for predicting the fire resistance performance of the gypsum board, e.g., in full scale tests under ASTM E119-09a for assemblies constructed under any of UL U305, U419, and/or U423 (2015 editions), and/or equivalent fire test procedures and standards. Passing the ASTM E119-09a test with the assembly of any one of these UL tests allows for a fire-rating. Briefly, UL U305 calls for wood studs in the assembly. UL U419 is a non-load bearing metal stud assembly, using 25 gauge studs. UL U423 is a load bearing metal stud assembly using 20 gauge studs. UL U419 is generally considered a more difficult test to pass than UL U305 or UL U423 because it uses light gauge steel studs that deform more easily than the studs used under UL U305 and UL U423.

In accordance with some embodiments, gypsum board is configured (e.g., as reduced weight and density, ⅝ inch thick gypsum panels) to meet or exceed a "one hour" fire rating pursuant to the fire containment and structural integrity requirements of assemblies constructed under one or more of UL U305, U419, and/or U423, using ASTM E119 and/or equivalent fire test procedures and standards. The present disclosure thus provides gypsum board (e.g., of reduced weight and density), and methods for making the same, that are capable of satisfying at least ¾ hour fire rating pursuant to the fire containment and structural integrity procedures and standards U419.

The gypsum board can be tested, e.g., in an assembly according to Underwriters Laboratories UL U305, U419, and U423 specifications and any other fire test procedure that is equivalent to any one of those fire test procedures. It should be understood that reference made herein to a particular fire test procedure of ASTM E-119 and using assemblies prepared in accordance with Underwriters Laboratories, such as, UL U305, U419, and U423, for example, also includes a fire test procedure, such as one promulgated by any other entity, that is equivalent to ASTM E119-09a and the particular UL standard in question.

Gypsum board according to some embodiments of the present disclosure is effective to withstand the hose stream test also conducted as part of the UL U305 procedures. In accordance with UL U305, gypsum board of some embodiments constructed in an assembly is subjected to fire endurance testing according to U305 for 30 minutes, at which time it is pulled from the heating environment and moved to another location for the hose stream test according to U305. The assembly is subjected to a stream of water from a fire hose equipped to send the water out at about 30 psi water pressure for a sixty second duration.

By extension, gypsum board formed according to principles of some embodiments of the present disclosure can be used in assemblies that are effective to inhibit the transmission of heat there through to meet the one-hour fire-resistance rating to be classified as Type X board under ASTM 1396/C 1396M-06. In other embodiments, assemblies can be constructed using gypsum board formed according to principles of the present disclosure that conform to the specification of other UL assemblies, such as UL U419 and U423, for example. In yet other embodiments, gypsum board formed according to principles of the present disclosure can be used in other assemblies that are substantially equivalent to at least one of U305, U419, and U423. Such assemblies can pass the one-hour fire rating and applicable hose stream testing for U305, U419, U423, and other equivalent fire test procedures in accordance with some embodiments.

In some embodiments, the High Temperature Shrinkage according to ASTM C1795-15 of the gypsum board typically is about 5% or less in the x-y directions (width-length), e.g., about 4% or less, about 3% or less, about 2% or less, about 1% or less, about 0.5% or less, etc.

With respect to the thickness of the board, i.e., the z-direction, the board can shrink to a relatively small degree (e.g., about 10% or less), or even expand (e.g., from about 0.1% to about 25%) according to various embodiments. As defined herein, it will be understood that a thickness shrinkage of less than a particular amount (e.g., less than about 10%) would encompass the situation where there is thickness expansion.

Thus, in some embodiments, the High Temperature Shrinkage of the gypsum board in the z-direction can be about 10% or less, e.g., about 9% or less, about 8% or less, about 7% or less, about 5% or less, about 3% or less, about 2% or less, about 1% or less, etc. For example, the High Temperature Shrinkage of the gypsum board in the z-direction can be from about 0.1% to about 10%, e.g., from about 0.1% to about 9%, from about 0.1% to about 8%, from about 0.1% to about 7%, from about 0.1% to about 5%, from about 0.5% to about 10%, from about 0.5% to about 5%, from about 1% to about 10%, from about 1% to about 8%, from about 1% to about 5%, from about 5% to about 10%, or from about 5% to about 8%.

In some embodiments, the board does not shrink in the z-direction, but actually desirably expands to counteract shrinkage of, e.g., set gypsum in the board. For example, the board can expand in the z-direction when tested according to ASTM C1795-15 (referred to herein as High Temperature Thickness Expansion in the z-direction) of at least about 0.1% (e.g., at least about 0.5%, at least about 3%, at least about 5%, at least about 10%, or at least about 20%) when heated to about 1560° F. (850° C.) according to ASTM C1795-15. For example, in some embodiments, the High Temperature Thickness Expansion in the z-direction (thickness) is from about 0.1% to about 20%, e.g., from about 0.1% to about 5%, from about 0.1% to about 10%, from about 5% to about 15%, from about 7% to about 20%, from about 10% to about 15%, from about 10% to about 20%, or from about 12% to about 20%. In some embodiments, when used in wall or other assemblies, such assemblies have fire testing performance comparable to assemblies made with heavier, denser commercial fire rated board.

With respect to gypsum board containing vermiculite in accordance with some embodiments, board that has a High Temperature Shrinkage of about 10% or less in the z direction or an expansion of at least about 0.1% in the z direction indicates that the board will pass one or more fire tests according to ASTM E119 using the assemblies constructed according to UL U305, U419, and U423, and the board will thus be fire-rated.

"Shrink resistance" is a measure of the proportion or percentage of the x-y (width-length) area of a segment of core that remains after the core is heated to a defined temperature over a defined period of time (see, e.g., U.S. Pat. No. 3,616,173). In some embodiments, a gypsum board formed according to principles of some embodiments of the present disclosure, and the methods for making same, can provide a board that exhibits an average shrink resistance of about 85% or greater (e.g., about 90% or greater, or about 95% or greater) when heated at about 1560° F. (850° C.) for one hour in accordance with ASTM C1795-15. In other embodiments, the gypsum board exhibits an average shrink resistance of about 75% or greater (e.g., about 80% or greater) when heated at about 1560° F. (850° C.) for one hour in accordance with ASTM C1795-15.

The gypsum layers between the cover sheets of some embodiments can be effective to provide a Thermal Insulation Index (TI) of about 17 minutes or greater, e.g., about 20 minutes or greater, in accordance with ASTM C1795-15. The gypsum layers can have any suitable density (D), e.g., as described herein. In some embodiments, the gypsum board has a reduced density, e.g., about 40 pcf or less, about 39 pcf or less, about 38 pcf or less, about 37 pcf or less, about 36 pcf or less, about 35 pcf or less, etc.). Some embodiments of the present disclosure allow for suitable fire resistance properties at such lower densities. The gypsum layers between the cover sheets can be effective in some embodiments to provide the gypsum board or any layer therein with a ratio of TI/D of about 0.6 minutes/pounds per cubic foot (about 0.038 minutes/(kg/m$^3$)) or more.

The board can have any desired thickness, such as from about 0.25 inch to about one inch (e.g., about 0.25 inch, about 0.375 inch, about 0.5 inch, about 0.625 inch, about 0.75 inch, about one inch, etc.). Desirably, the board has good strength as described herein, such as an average gypsum layer (containing the expandable graphite) hardness of at least about 11 pounds (5 kg), e.g., at least about 13 pounds (5.9 kg), or at least about 15 pounds (6.8 kg).

In some embodiments, the board has a nominal thickness of about ⅝ inch. For example, the gypsum board in some embodiments is effective to inhibit the transmission of heat through an assembly constructed in accordance with any one of UL Design Numbers U305, U419 or U423, the assembly having a first side with a single layer of gypsum boards and a second side with a single layer of gypsum boards. ASTM E119-09a involves placing thermocouples in numerous places throughout a particular assembly. The thermocouples then monitor temperature as the assembly is exposed to heat over time. In this respect, surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a. ASTM E119 specifies that the assembly fails the test if any of the thermocouples exceeds a certain preset temperature (ambient plus 325° F.), or if the average of the temperatures from the thermocouples exceeds a different preset temperature (ambient plus 250° F.).

In some embodiments of gypsum board, when heated, the maximum single value of the temperature sensors is less than about 325° F. plus ambient temperature after about 50 minutes, and/or or the average value of the temperature sensors is less than about 250° F. plus ambient temperature after about 50 minutes. In some embodiments, the board has a density of about 40 pounds per cubic foot or less.

In some embodiments, when the surfaces on the first side of the assembly of gypsum board are heated, the maximum single value of the temperature sensors is less than about 325° F. plus ambient temperature after about 55 minutes, and/or the average value of the temperature sensors is less than about 250° F. plus ambient temperature after about 55 minutes. In other embodiments, when the surfaces of gypsum board on the first side of the assembly are heated, the maximum single value of the temperature sensors is less than about 325° F. plus ambient temperature after about 60 minutes and/or the average value of the temperature sensors is less than about 250° F. plus ambient temperature after about 60 minutes. In other embodiments, when the surfaces of gypsum board on the first side of the assembly are heated, the maximum single value of the temperature sensors is less than about 325° F. plus ambient temperature after about 50 minutes, and/or the average value of the temperature sensors is less than about 250° F. plus ambient temperature after about 50 minutes. In other embodiments, when the surfaces of gypsum board on the first side of the assembly are heated, the maximum single value of the temperature sensors is less than about 325° F. plus ambient temperature after about 55 minutes, and/or the average value of the temperature sensors is less than about 250° F. plus ambient temperature after about 55 minutes. In other embodiments, when the surfaces of gypsum board on the first side of the assembly are heated, the maximum single value of the temperature sensors is less than about 325° F. plus ambient temperature after about 60 minutes, and the average value of the temperature sensors is less than about 250° F. plus ambient temperature after about 60 minutes.

In some embodiments, the gypsum board is effective to inhibit the transmission of heat through the assembly when constructed in accordance with UL Design Number U305 so as to achieve a one hour fire rating under ASTM E119-09a. In some embodiments, the board is effective to inhibit the transmission of heat through the assembly when constructed in accordance with UL Design Number U419 so as to achieve a one hour fire rating under ASTM E119-09a. In some embodiments, the gypsum board is effective to inhibit the transmission of heat through the assembly when constructed in accordance with UL Design Number U423 so as to achieve a one hour fire rating under ASTM E119-09a. In some embodiments, the board has a Thermal Insulation Index (TI) of about 20 minutes or greater and/or a High Temperature Shrinkage (S) of about 10% or less, in accordance with ASTM C1795-15. In some embodiments, the board has a ratio of High Temperature Thickness Expansion (TE) to S (TEIS) of about 0.06 or more, such as about 0.2 or more.

In some embodiments, gypsum board made according to the disclosure meets strength test protocols according to ASTM Standard C473-10. For example, in some embodiments, when the board is cast at a thickness of ½ inch, the board has a nail pull resistance of at least about 65 lb$_f$ (pounds force, which is sometimes referred to as simply "lb" or "lbs" for convenience by those of ordinary skill in the art, who understand this is a measurement of force) as determined according to ASTM C473-10 (method B), e.g., at least about 68 lb$_f$, at least about 70 lb$_f$, at least about 72 lb$_f$, at least about 74 lb$_f$, at least about 75 lb$_f$, at least about 76 lb$_f$, at least about 77 lb$_f$, etc. In various embodiments, the nail pull resistance can be from about 65 lb$_f$ to about 100 lb$_f$, from about 65 lb$_f$ to about 95 lb$_f$, from about 65 lb$_f$ to about 90 lb$_f$, from about 65 lb$_f$ to about 85 lb$_f$, from about 65 lb$_f$ to about 80 lb$_f$, from about 65 lb$_f$ to about 75 lb$_f$, from about 68 lb$_f$ to about 100 lb$_f$, from about 68 lb$_f$ to about 95 lb$_f$, from about 68 lb$_f$ to about 90 lb$_f$, from about 68 lb$_f$ to about 85 lb$_f$, from about 68 lb$_f$ to about 80 lb$_f$, from about 70 lb$_f$ to about 100 lb$_f$, from about 70 lb$_f$ to about 95 lb$_f$, from about 70 lb$_f$ to about 90 lb$_f$, from about 70 lb$_f$ to about 85 lb$_f$, from about 70 lb$_f$ to about 80 lb$_f$, from about 72 lb$_f$ to about 100 lb$_f$, from about 72 lb$_f$ to about 95 lb$_f$, from about 72 lb$_f$ to about 90 lb$_f$, from about 72 lb$_f$ to about 85 lb$_f$, from about 72 lb$_f$ to about 80 lb$_f$, from about 72 lb$_f$ to about 77 lb$_f$, from about 72 lb$_f$ to about 75 lb$_f$, from about 75 lb$_f$ to about 100 lb$_f$, from about 75 lb$_f$ to about 95 lb$_f$, from about 75 lb$_f$ to about 90 lb$_f$, from about 75 lb$_f$ to about 85 lb$_f$, from about 75 lb$_f$ to about 80 lb$_f$, from about 75 lb$_f$ to about 77 lb$_f$, from about 77 lb$_f$ to about 100 lb$_f$, from about 77 lb$_f$ to about 95 lb$_f$, from about 77 lb$_f$ to about 90 lb$_f$, from about 77 lb$_f$ to about 85 lb$_f$, or from about 77 lb$_f$ to about 80 lb$_f$.

With respect to flexural strength, in some embodiments, when cast in a board of one-half inch thickness, the board has a flexural strength of at least about 36 lb$_f$ in a machine direction (e.g., at least about 38 lb$_f$, at least about 40 lb$_f$, etc.)

and/or at least about 107 $lb_f$ (e.g., at least about 110 $lb_f$, at least about 112 $lb_f$, etc.) in a cross-machine direction as determined according to the ASTM standard C473-10, method B. In various embodiments, the board can have a flexural strength in a machine direction of from about 36 $lb_f$ to about 60 $lb_f$, e.g., from about 36 $lb_f$ to about 55 $lb_f$, from about 36 $lb_f$ to about 50 $lb_f$, from about 36 $lb_f$ to about 45 $lb_f$, from about 36 $lb_f$ to about 40 $lb_f$, from about 36 $lb_f$ to about 38 $lb_f$, from about 38 $lb_f$ to about 60 $lb_f$, from about 38 $lb_f$ to about 55 $lb_f$, from about 38 $lb_f$ to about 50 $lb_f$, from about 38 $lb_f$ to about 45 $lb_f$, from about 38 $lb_f$ to about 40 $lb_f$, from about 40 $lb_f$ to about 60 $lb_f$, from about 40 $lb_f$ to about 55 $lb_f$, from about 40 $lb_f$ to about 50 $lb_f$, or from about 40 $lb_f$ to about 45 $lb_f$. In various embodiments, the board can have a flexural strength in a cross-machine direction of from about 107 $lb_f$ to about 130 $lb_f$, e.g., from about 107 $lb_f$ to about 125 $lb_f$, from about 107 $lb_f$ to about 120 $lb_f$, from about 107 $lb_f$ to about 115 $lb_f$, from about 107 $lb_f$ to about 112 $lb_f$, from about 107 $lb_f$ to about 110 $lb_f$, from about 110 $lb_f$ to about 130 $lb_f$, from about 110 $lb_f$ to about 125 $lb_f$, from about 110 $lb_f$ to about 120 $lb_f$, from about 110 $lb_f$ to about 115 $lb_f$, from about 110 $lb_f$ to about 112 $lb_f$, from about 112 $lb_f$ to about 130 $lb_f$, from about 112 $lb_f$ to about 125 $lb_f$, from about 112 $lb_f$ to about 120 $lb_f$, or from about 112 $lb_f$ to about 115 $lb_f$.

In addition, in some embodiments, board can have an average core hardness of at least about 11 $lb_f$, e.g., at least about 12 $lb_f$, at least about 13 $lb_f$, at least about 14 $lb_f$, at least about 15 $lb_f$, at least about 16 $lb_f$, at least about 17 $lb_f$, at least about 18 $lb_f$, at least about 19 $lb_f$, at least about 20 $lb_f$, at least about 21 $lb_f$, or at least about 22 $lb_f$, as determined according to ASTM C473-10, method B. In some embodiments, board can have an average gypsum layer hardness of from about 11 $lb_f$ to about 25 $lb_f$, e.g., from about 11 $lb_f$ to about 22 $lb_f$, from about 11 $lb_f$ to about 21 $lb_f$, from about 11 $lb_f$ to about 20 $lb_f$, from about 11 $lb_f$ to about 19 $lb_f$, from about 11 $lb_f$ to about 18 $lb_f$, from about 11 $lb_f$ to about 17 $lb_f$, from about 11 $lb_f$ to about 16 $lb_f$, from about 11 $lb_f$ to about 15 $lb_f$, from about 11 $lb_f$ to about 14 $lb_f$, from about 11 $lb_f$ to about 13 $lb_f$, from about 11 $lb_f$ to about 12 $lb_f$, from about 12 $lb_f$ to about 25 $lb_f$, from about 12 $lb_f$ to about 22 $lb_f$, from about 12 $lb_f$ to about 21 $lb_f$, from about 12 $lb_f$ to about 20 $lb_f$, from about 12 $lb_f$ to about 19 $lb_f$, from about 12 $lb_f$ to about 18 $lb_f$, from about 12 $lb_f$ to about 17 $lb_f$, from about 12 $lb_f$ to about 16 $lb_f$, from about 12 $lb_f$ to about 15 $lb_f$, from about 12 $lb_f$ to about 14 $lb_f$, from about 12 $lb_f$ to about 13 $lb_f$, from about 13 $lb_f$ to about 25 $lb_f$, from about 13 $lb_f$ to about 22 $lb_f$, from about 13 $lb_f$ to about 21 $lb_f$, from about 13 $lb_f$ to about 20 $lb_f$, from about 13 $lb_f$ to about 19 $lb_f$, from about 13 $lb_f$ to about 18 $lb_f$, from about 13 $lb_f$ to about 17 $lb_f$, from about 13 $lb_f$ to about 16 $lb_f$, from about 13 $lb_f$ to about 15 $lb_f$, from about 13 $lb_f$ to about 14 $lb_f$, from about 14 $lb_f$ to about 25 $lb_f$, from about 14 $lb_f$ to about 22 $lb_f$, from about 14 $lb_f$ to about 21 $lb_f$, from about 14 $lb_f$ to about 20 $lb_f$, from about 14 $lb_f$ to about 19 $lb_f$, from about 14 $lb_f$ to about 18 $lb_f$, from about 14 $lb_f$ to about 17 $lb_f$, from about 14 $lb_f$ to about 16 $lb_f$, from about 14 $lb_f$ to about 15 $lb_f$, from about 15 $lb_f$ to about 25 $lb_f$, from about 15 $lb_f$ to about 22 $lb_f$, from about 15 $lb_f$ to about 21 $lb_f$, from about 15 $lb_f$ to about 20 $lb_f$, from about 15 $lb_f$ to about 19 $lb_f$, from about 15 $lb_f$ to about 18 $lb_f$, from about 15 $lb_f$ to about 17 $lb_f$, from about 15 $lb_f$ to about 16 $lb_f$, from about 16 $lb_f$ to about 25 $lb_f$, from about 16 $lb_f$ to about 22 $lb_f$, from about 16 $lb_f$ to about 21 $lb_f$, from about 16 $lb_f$ to about 20 $lb_f$, from about 16 $lb_f$ to about 19 $lb_f$, from about 16 $lb_f$ to about 18 $lb_f$, from about 16 $lb_f$ to about 17 $lb_f$, from about 17 $lb_f$ to about 25 $lb_f$, from about 17 $lb_f$ to about 22 $lb_f$, from about 17 $lb_f$ to about 21 $lb_f$, from about 17 $lb_f$ to about 20 $lb_f$, from about 17 $lb_f$ to about 19 $lb_f$, from about 17 $lb_f$ to about 18 $lb_f$, from about 18 $lb_f$ to about 25 $lb_f$, from about 18 $lb_f$ to about 22 $lb_f$, from about 18 $lb_f$ to about 21 $lb_f$, from about 18 $lb_f$ to about 20 $lb_f$, from about 18 $lb_f$ to about 19 $lb_f$, from about 19 $lb_f$ to about 25 $lb_f$, from about 19 $lb_f$ to about 22 $lb_f$, from about 19 $lb_f$ to about 21 $lb_f$, from about 19 $lb_f$ to about 20 $lb_f$, from about 20 $lb_f$ to about 25 $lb_f$, from about 21 $lb_f$ to about 25 $lb_f$, from about 21 $lb_f$ to about 22 $lb_f$, or from about 22 $lb_f$ to about 25 $lb_f$.

The invention is further illustrated by the following exemplary embodiments. However, the invention is not limited by the following embodiments.

Clause 1. A gypsum board and a method of making a gypsum board as described herein.

Clause 2. A gypsum board comprising: (a) face and back cover sheets; (b) a board core disposed between the face and back cover sheets, the core comprising set gypsum formed from a core slurry comprising water, stucco, and core intumescent material; (c) a back skim coat layer defining first and second skim coat faces, the back skim coat formed from a back skim coat slurry comprising water, stucco, and a skim coat intumescent material, the back skim coat disposed in bonding relation to the core, the first face of the skim coat layer facing the back cover sheet, and the second face of the skim coat layer facing the board core; and (d) the gypsum board having at least one of the following: a High Temperature Shrinkage (S) of about 10% or less in the z direction when heated to about 1560° F. (850° C.), according to ASTM C1795-15, a High Temperature Shrinkage (S) of about 10% or less in the x-y directions (width-length) when heated to about 1560° F. (850° C.) according to ASTM C1795-15, a Thermal Insulation Index (TI) of about 20 minutes or greater according to ASTM C1795-15, a High Temperature Thickness Expansion in the z direction of from about 0.1% to about 20% when thickness is evaluated according to the analogous techniques and methodology of ASTM C1795-15, and/or where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes.

Clause 3. A gypsum board comprising: (a) face and back cover sheets; (b) a board core disposed between the face and back cover sheets, the core comprising set gypsum formed from a core slurry comprising water, stucco, and core intumescent material, the core defining first and second core faces; (c) two opposing edges formed from an edge slurry containing water, stucco, and edge intumescent material, the edges on either end of the core; and; (d) the gypsum board having at least one of the following: a High Temperature Shrinkage (S) of about 10% or less in the z direction when heated to about 1560° F. (850° C.), according to ASTM C1795-15, a High Temperature Shrinkage (S) of about 10% or less in the x-y directions (width-length) when heated to about 1560° F. (850° C.) according to ASTM C1795-15, a Thermal Insulation Index (TI) of about 20 minutes or greater according to ASTM C1795-15, a High Temperature Thickness Expansion in the z direction of from about 0.1% to about 20% when thickness is evaluated according to the analogous techniques and methodology of ASTM C1795-15, and/or where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes.

Clause 4. A gypsum board comprising: (a) face and back cover sheets; (b) a board core disposed between the face and back cover sheets, the core comprising set gypsum formed from a core slurry comprising water, stucco, and core intumescent material; (c) a back skim coat layer defining first and second back skim coat faces, the back skim coat formed from a back skim coat slurry comprising water, stucco, and a skim coat intumescent material, the back skim coat disposed in bonding relation to the core, the first face of the back skim coat layer facing the back cover sheet, and the second face of the back skim coat layer facing the board core; (d) a face skim coat layer defining first and second face skim coat faces, the face skim coat formed from a face skim coat slurry comprising water, stucco, and an optional skim coat intumescent material, the face skim coat disposed in bonding relation to the core, the first face of the face skim coat layer facing the face cover sheet, and the second face of the face skim coat layer facing the board core, wherein the back skim coat slurry and the face skim coat slurry can be the same or different; (e) two opposing edges on either end of the core and formed from an edge slurry containing water, stucco, and edge intumescent material, wherein the edge slurry can be the same or different from each of the back skim coat slurry and the face skim coat slurry; and (f) the gypsum board having at least one of the following: a High Temperature Shrinkage (S) of about 10% or less in the z direction when heated to about 1560° F. (850° C.), according to ASTM C1795-15, a High Temperature Shrinkage (S) of about 10% or less in the x-y directions (width-length) when heated to about 1560° F. (850° C.) according to ASTM C1795-15, a Thermal Insulation Index (TI) of about 20 minutes or greater according to ASTM C1795-15, a High Temperature Thickness Expansion in the z direction of from about 0.1% to about 20% when thickness is evaluated according to the analogous techniques and methodology of ASTM C1795-15, and/or where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes.

Clause 5. The gypsum board of clause 4, wherein the face skim coat slurry contains the skim coat intumescent material.

Clause 6. The gypsum board of any one of clauses 2-5, wherein the core has a density and the back skim coat layer has a density that is greater than the core density.

Clause 7. The gypsum board of any one of clauses 3-6, wherein the core has a density and the edges each have a density that is greater than the core density.

Clause 8. The gypsum board of any one of clauses 4-7, wherein the core has a density and the face skim coat layer has a density that is greater than the core density.

Clause 9. The gypsum board of any one of clauses 2-8, wherein the core intumescent material is expandable vermiculite, expandable graphite, perlite, or any combination thereof.

Clause 10. The gypsum board of any one of clauses 2-8, wherein the core intumescent material comprises expandable vermiculite.

Clause 11. The gypsum board of any one of clauses 2-8, wherein the core intumescent material comprises expandable graphite.

Clause 12. The gypsum board of any one of clauses 2-8, wherein the core intumescent material comprises perlite Clause 13. The gypsum board of any one of clauses 2-8, wherein the core intumescent material comprises expandable vermiculite, expandable graphite, or any combination thereof.

Clause 14. The gypsum board of any one of clauses 2-13, wherein the skim coat intumescent material is expandable vermiculite, expandable graphite, perlite, or any combination thereof.

Clause 15. The gypsum board of any one of clauses 2-13, wherein the skim coat intumescent material comprises vermiculite.

Clause 16. The gypsum board of any one of clauses 2-13, wherein the skim coat intumescent material comprises expandable graphite.

Clause 17. The gypsum board of any one of clauses 2-13, wherein the skim coat intumescent material comprises expandable perlite.

Clause 18. The gypsum board of any one of clauses 2-13, wherein the skim coat intumescent material comprises expandable vermiculite, expandable graphite, or any combination thereof.

Clause 19. The gypsum board of any one of clauses 3-18, wherein the edge intumescent material is expandable vermiculite, expandable graphite, perlite, or any combination thereof.

Clause 20. The gypsum board of any one of clauses 3-18, wherein the edge intumescent material comprises vermiculite.

Clause 21. The gypsum board of any one of clauses 3-18, wherein the edge intumescent material comprises expandable graphite.

Clause 22. The gypsum board of any one of clauses 3-18, wherein the edge intumescent material comprises expandable perlite.

Clause 23. The gypsum board of any one of clauses 3-18, wherein the edge intumescent material comprises expandable vermiculite, expandable graphite, or any combination thereof.

Clause 24. The gypsum board of any one of clauses 3-23, wherein the edge slurry is divided from the core slurry and/or a skim coat slurry, and the edge intumescent material is added to the edge slurry in dry form (e.g., as a powder) after the edge slurry is divided from the core slurry and/or skim coat slurry.

Clause 25. The gypsum board of any one of clauses 2-24, wherein at least one of the core, skim coat, and/or edge intumescent materials contains expandable vermiculite in the form of Grade No. 4 unexpanded vermiculite, Grade No. 5 unexpanded vermiculite, or any combination thereof (U.S. grading system).

Clause 26. The gypsum board of any one of clauses 2-25, wherein at least one of the core, skim coat, and/or edge intumescent materials contains expandable vermiculite in the form of particles where at least about 50% of the particles are larger than about 50 mesh.

Clause 27. The gypsum board of any one of clauses 2-26, wherein at least one of the core, skim coat, and/or edge intumescent materials contains expandable vermiculite in the form of particles where at least about 70% of the particles are larger than about 70 mesh.

Clause 28. The gypsum board of any one of clauses 2-27, wherein at least one of the core, skim coat, and/or edge intumescent materials contains expandable vermiculite having a high volume expansion of at least about 300% (e.g., from about 300%) to about 380% of its original volume after being placed for one hour in a chamber having a temperature of about 1560° F. (about 850° C.).

Clause 29. The gypsum board of any one of clauses 2-28, wherein at least one of the core, skim coat, and/or edge intumescent materials contains expandable graphite having an expansion onset temperature of from about 220° F. (104° C.) to about 750° F. (400° C.).

Clause 30. The gypsum board of any one of clauses 2-29, wherein at least one of the core, skim coat, and/or edge intumescent materials contains expandable graphite having a particle size of from about 5 mesh to about 400 mesh.

Clause 31. The gypsum board of any one of clauses 2-30, wherein at least one of the core, skim coat, and/or edge intumescent materials contains expandable graphite having a density of from about 20 pcf to about 120 pcf.

Clause 32. The gypsum board of any one of clauses 2-31, wherein the core intumescent material is present in the core slurry in an amount of from about 1% to about 5% by weight of the stucco, such as from about 2% to about 4% by weight of the stucco.

Clause 33. The gypsum board of any one of clauses 2-32, wherein the skim coat intumescent material is present in the back skim coat slurry and/or face skim coat slurry in an amount of from about 2% to about 20% by weight of the stucco in the skim coat slurry, such as from about 4% to about 15% by weight of the stucco in the skim coat slurry.

Clause 34. The gypsum board of any one of clauses 2-33, wherein the edge intumescent material is present in the edge slurry in an amount of from about 3% to about 20% by weight of the stucco, such as from about 4% to about 15% by weight of the stucco.

Clause 35. The gypsum board of any one of clauses 2-34, wherein a weight ratio between the core intumescent material and the skim coat intumescent material is from about 1:1.2 to about 1:4, such as from about 1:1.5 to about 1:2.5.

Clause 36. The gypsum board of any one of clauses 2-35, wherein a weight ratio between the core intumescent material and the edge intumescent material is from about 1:1.5 to about 1:4, such as from about 1:2 to about 1:3.

Clause 37. The gypsum board of any one of clauses 3-36, wherein the edges are formed from the face skim coat slurry and are continuous from the face skim coat.

Clause 38. The gypsum board of any one of clauses 3-36, wherein the edges are formed from the back skim coat slurry and are continuous from the back skim coat.

Clause 39. The gypsum board of any one of clauses 3-38, wherein the board has a density of about 40 lb/MSF or less and a nail pull resistance of at least about 72 $lb_f$ according to ASTM 473-10, method B.

Clause 40. The gypsum board of any one of clauses 2-39, wherein the board has a High Temperature Shrinkage (S) of about 10% or less in the z direction when heated to about 1560° F. (850° C.), according to ASTM C1795-15; and a High Temperature Shrinkage (S) of about 10% or less in the x-y directions (width-length) when heated to about 1560° F. (850° C.) according to ASTM C1795-15.

Clause 41. The gypsum board of any one of clauses 2-39, wherein the board has a High Temperature Shrinkage (S) of about 10% or less in the z direction when heated to about 1560° F. (850° C.), according to ASTM C1795-15; and a Thermal Insulation Index (TI) of about 20 minutes or greater according to ASTM C1795-15.

Clause 42. The gypsum board of any one of clauses 2-39, wherein the board has a High Temperature Shrinkage (S) of about 10% or less in the z direction when heated to about 1560° F. (850° C.), according to ASTM C1795-15; and a High Temperature Thickness Expansion in the z direction of at least about 0.1% when thickness is evaluated according to the analogous techniques and methodology of ASTM C1795-15.

Clause 43. The gypsum board of any one of clauses 2-39, wherein the board has a High Temperature Shrinkage (S) of about 10% or less in the z direction when heated to about 1560° F. (850° C.), according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 44. The gypsum board of any one of clauses 2-39, wherein the board has a High Temperature Shrinkage (S) of about 10% or less in the x-y directions (width-length) when heated to about 1560° F. (850° C.) according to ASTM C1795-15; and a Thermal Insulation Index (TI) of about 20 minutes or greater according to ASTM C1795-15.

Clause 45. The gypsum board of any one of clauses 2-39, wherein the board has a High Temperature Shrinkage (S) of about 10% or less in the x-y directions (width-length) when heated to about 1560° F. (850° C.) according to ASTM C1795-15; and a High Temperature Thickness Expansion in the z direction of at least about 0.1% when thickness is evaluated according to the analogous techniques and methodology of ASTM C1795-15.

Clause 46. The gypsum board of any one of clauses 2-39, wherein the board has a High Temperature Shrinkage (S) of about 10% or less in the x-y directions (width-length) when heated to about 1560° F. (850° C.) according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 47. The gypsum board of any one of clauses 2-39, wherein the board has a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

Clause 48. The gypsum board of any one of clauses 2-39, wherein the board has a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 49. The gypsum board of any one of clauses 2-39, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and a Thermal Insulation Index (TI) of about 20 minutes or greater according to ASTM C1795-15.

Clause 50. The gypsum board of any one of clauses 2-39, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

Clause 51. The gypsum board of any one of clauses 2-39, wherein the board has a High Temperature Shrinkage (S) of about 10% or less in the z direction when heated to about 1560° F. (850° C.), according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 52. The gypsum board of any one of clauses 2-39, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and a High Temperature Thickness Expansion in the z direction of at least about 0.1% when thickness is evaluated according to the analogous techniques and methodology of ASTM C1795-15.

Clause 53. The gypsum board of any one of clauses 2-39, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 54. The gypsum board of any one of clauses 2-39, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-

09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 55. The gypsum board of any one of clauses 2-39, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

Clause 56. The gypsum board of any one of clauses 2-39, wherein the board has a High Temperature Shrinkage (S) of about 10% or less in the x-y directions (width-length) when heated to about 1560° F. (850° C.) according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 57. The gypsum board of any one of clauses 2-39, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 58. The gypsum board of any one of clauses 2-39, wherein the board has a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 59. The gypsum board of any one of clauses 2-39, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

Clause 60. The gypsum board of any one of clauses 2-39, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 61. The gypsum board of any one of clauses 2-39, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F.

(850° C.) according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 62. The gypsum board of any one of clauses 2-39, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 63. The gypsum board of any one of clauses 2-39, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 64. The gypsum board of any one of clauses 2-39, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 65. A method of making gypsum board, the method comprising: (a) mixing at least water, stucco, and core intumescent material to form a core slurry; (b) applying the core slurry in a bonding relation to a face cover sheet to form a face composite having a core slurry surface and a paper surface; (c) mixing at least water, stucco, and a skim coat intumescent material to form a back skim coat slurry; (d) applying the back skim coat slurry in a bonding relation to a back cover sheet to form a back composite having a skim coat slurry surface and a paper surface; (e) applying the back composite in a bonding relation to the face composite to form a board precursor, wherein the back skim coat slurry surface faces the face core slurry surface; (f) drying the board precursor to form the gypsum board, the gypsum board having at least one of the following: a High Temperature Shrinkage (S) of about 10% or less in the z direction when heated to about 1560° F. (850° C.), according to ASTM C1795-15, a High Temperature Shrinkage (S) of about 10% or less in the x-y directions (width-length) when heated to about 1560° F. (850° C.) according to ASTM C1795-15, a Thermal Insulation Index (TI) of about 20 minutes or greater according to ASTM C1795-15, a High Temperature Thickness Expansion in the z direction of from about 0.1% to about 20% when thickness is evaluated according to the analogous techniques and methodology of ASTM C1795-15, and/or where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes.

Clause 66. A method of making gypsum board, the method comprising: (a) mixing at least water, stucco, and core intumescent material to form a core slurry; (b) applying the core slurry to a face cover sheet to form a face composite having a core slurry surface and a paper surface, the core slurry forming a core in bonding relation to the face cover sheet; (c) mixing at least water, stucco, and an edge intumescent material to form an edge slurry; (d) applying the edge slurry in a manner that it forms two edges with one edge on either end of the core; (e) applying a back cover sheet to the face composite, the back cover sheet facing the core slurry surface of the face composite; and (f) drying the board precursor to form the gypsum board, the gypsum board having at least one of the following: a High Temperature Shrinkage (S) of about 10% or less in the z direction when heated to about 1560° F. (850° C.), according to ASTM C1795-15, a High Temperature Shrinkage (S) of about 10% or less in the x-y directions (width-length) when heated to about 1560° F. (850° C.) according to ASTM C1795-15, a Thermal Insulation Index (TI) of about 20 minutes or greater according to ASTM C1795-15, a High Temperature Thickness Expansion in the z direction of from about 0.1% to about 20% when thickness is evaluated according to the analogous techniques and methodology of ASTM C1795-15, and/or where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes.

Clause 67. A method of making gypsum board, the method comprising: (a) mixing at least water, stucco, and core intumescent material to form a core slurry; (b) mixing at least water, stucco, and an optional skim coat intumescent material to form a face skim coat slurry; (c) applying the face skim coat slurry to a face cover sheet; (d) applying the core slurry to the face skim coat slurry as disposed on the face cover sheet to form a face composite having a core slurry surface and a paper surface; (e) mixing at least water, stucco, and a skim coat intumescent material to form a back skim coat slurry, the face skim coat slurry and back skim coat slurry being the same or different; (f) applying the back skim coat slurry in a bonding relation to a back cover sheet to form a back composite having a skim coat slurry surface and a paper surface; (g) forming edges on either end of the core slurry, the edges formed from the face skim coat slurry and/or the back skim coat slurry; (h) applying the back composite in a bonding relation to the face composite to form a board precursor, wherein the back skim coat slurry surface faces the core slurry surface, the edges being continuous from the applied face skim coat or back skim coat; (i) drying the board precursor to form the gypsum board, the gypsum board having at least one of the following: a High Temperature Shrinkage (S) of about 10% or less in the z direction when heated to about 1560° F. (850° C.), according to ASTM C1795-15, a High Temperature Shrinkage (S) of about 10% or less in the x-y directions (width-length) when heated to about 1560° F. (850° C.) according to ASTM C1795-15, a Thermal Insulation Index (TI) of about 20 minutes or greater according to ASTM C1795-15, a High Temperature Thickness Expansion in the z direction of from about 0.1% to about 20% when thickness is evaluated according to the analogous techniques and methodology of ASTM C1795-15, and/or where, when the board is cast at a nominal thickness of ⅝-inch, an assembly is constructed in accordance with any one of UL Design Numbers U305, U419 or U423, the assembly having a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after about 60 minutes; or an average value of the temperature sensors is less than about 250° F. plus ambient temperature after about 60 minutes.

Clause 68. The method of clause 67, wherein the face skim coat slurry contains the skim coat intumescent material.

Clause 69. The method of any one of clauses 65-68, wherein the core slurry has a density and the back skim coat slurry has a density that is greater than the core slurry density.

Clause 70. The method of any one of clauses 65-69, wherein the core slurry has a density and the edge slurry has a density that is greater than the core slurry density.

Clause 71. The method of any one of clauses 65-70, wherein the core slurry has a density and the face skim coat slurry has a density that is greater than the core slurry density.

Clause 72. The method of any one of clauses 65-71, wherein the core intumescent material is perlite, expandable vermiculite, expandable graphite, or any combination thereof.

Clause 73. The method of any one of clauses 65-71, wherein the core intumescent material comprises expandable vermiculite.

Clause 74. The method of any one of clauses 65-71, wherein the core intumescent material comprises expandable graphite.

Clause 75. The method of any one of clauses 65-71, wherein the core intumescent material comprises perlite.

Clause 76. The method of any one of clauses 65-71, wherein the core intumescent material comprises expandable vermiculite, expandable graphite, or the combination thereof.

Clause 77. The method of any one of clauses 65-76, wherein the skim coat intumescent material is perlite, expandable vermiculite, expandable graphite, or any combination thereof.

Clause 78. The method of any one of clauses 65-76, wherein the skim coat intumescent material comprises expandable vermiculite.

Clause 79. The method of any one of clauses 65-76, wherein the skim coat intumescent material comprises expandable graphite.

Clause 80. The method of any one of clauses 65-76, wherein the skim coat intumescent material comprises perlite.

Clause 81. The method of any one of clauses 65-76, wherein the skim coat intumescent material comprises expandable vermiculite and expandable graphite.

Clause 82. The method of any one of clauses 66-81, wherein the edge intumescent material is perlite, expandable vermiculite, expandable graphite, or any combination thereof.

Clause 83. The method of any one of clauses 66-82, wherein the edge intumescent material comprises expandable vermiculite Clause 84. The method of any one of clauses 66-82, wherein the edge intumescent material comprises expandable graphite.

Clause 85. The method of any one of clauses 66-82, wherein the edge intumescent material comprises perlite.

Clause 86. The method of any one of clauses 66-82, wherein the edge intumescent material comprises expandable vermiculite and expandable graphite.

Clause 87. The method of any one of clauses 66-82, wherein the edge intumescent material is added to the edge slurry in dry form (e.g., as a powder).

Clause 88. The method of any one of clauses 65-87, wherein at least one of the core, skim coat, and/or edge intumescent materials contains expandable vermiculite in the form of Grade No. 4 unexpanded vermiculite, Grade No. 5 unexpanded vermiculite, or any combination thereof (U.S. grading system).

Clause 89. The method of any one of clauses 65-88, wherein at least one of the core, skim coat, and/or edge intumescent materials contains expandable vermiculite in the form of particles where at least about 50% of the particles are larger than about 50 mesh.

Clause 90. The method of any one of clauses 65-89, wherein at least one of the core, skim coat, and/or edge intumescent materials contains expandable vermiculite in the form of particles where at least about 70% of the particles are larger than about 70 mesh.

Clause 91. The method of any one of clauses 65-90, wherein at least one of the core, skim coat, and/or edge intumescent materials contains expandable vermiculite having a high volume expansion of at least about 300% (e.g., from about 300%) to about 380% of its original volume after being placed for one hour in a chamber having a temperature of about 1560° F. (about 850° C.).

Clause 92. The method of any one of clauses 65-91, wherein at least one of the core, skim coat, and/or edge intumescent materials contains expandable graphite having an expansion onset temperature of from about 220° F. (104° C.) to about 750° F. (400° C.).

Clause 93. The method of any one of clauses 65-92, wherein at least one of the core, skim coat, and/or edge intumescent materials contains expandable graphite having a particle size of from about 5 mesh to about 400 mesh.

Clause 94. The method of any one of clauses 65-93, wherein at least one of the core, skim coat, and/or edge intumescent materials contains expandable graphite having a density of from about 20 pcf to about 120 pcf.

Clause 95. The method of any one of clauses 65-94, wherein the core intumescent material is present in the core slurry in an amount of from about 1% to about 5% by weight of the stucco, such as from about 2% to about 4% by weight of the stucco.

Clause 96. The method of any one of clauses 65-95, wherein the skim coat intumescent material is present in the back skim coat slurry and/or face skim coat slurry in an amount of from about 2% to about 20% by weight of the stucco, such as from about 4% to about 15% by weight of the stucco.

Clause 97. The method of any one of clauses 65-96, wherein the edge intumescent material is present in the edge slurry in an amount of from about 3% to about 20% by weight of the stucco, such as from about 4% to about 15% by weight of the stucco.

Clause 98. The method of any one of clauses 65-97, wherein a weight ratio between the core intumescent material and the skim coat intumescent material is from about 1:1.2 to about 1:4, such as from about 1:1.5 to about 1:2.5.

Clause 99. The method of any one of clauses 65-98, wherein a weight ratio between the core intumescent material and the edge intumescent material is from about 1:1.5 to about 1:4, such as from about 1:2 to about 1:3.

Clause 100. The method of any one of clauses 65-99, wherein the edges are formed from the face skim coat slurry and are continuous from the face skim coat slurry in the precursor.

Clause 101. The method of any one of clauses 66-100, wherein the edges are formed from the back skim coat slurry and are continuous from the back skim coat slurry in the precursor.

Clause 102. The method of any one of clauses 66-101, wherein the board has a density of about 40 lb/MSF or less and a nail pull resistance of at least about 72 $lb_f$ according to ASTM 473-10, method B.

Clause 103. The method of any one of clauses 65-102, wherein the board has a High Temperature Shrinkage (S) of about 10% or less in the z direction when heated to about 1560° F. (850° C.), according to ASTM C1795-15; and a High Temperature Shrinkage (S) of about 10% or less in the x-y directions (width-length) when heated to about 1560° F. (850° C.) according to ASTM C1795-15.

Clause 104. The method of any one of clauses 65-102, wherein the board has a High Temperature Shrinkage (S) of about 10% or less in the z direction when heated to about 1560° F. (850° C.), according to ASTM C1795-15; and a Thermal Insulation Index (TI) of about 20 minutes or greater according to ASTM C1795-15.

Clause 105. The method of any one of clauses 65-102, wherein the board has a High Temperature Shrinkage (S) of about 10% or less in the z direction when heated to about 1560° F. (850° C.), according to ASTM C1795-15; and a High Temperature Thickness Expansion in the z direction of at least about 0.1% when thickness is evaluated according to the analogous techniques and methodology of ASTM C1795-15.

Clause 106. The method of any one of clauses 65-102, wherein the board has a High Temperature Shrinkage (S) of about 10% or less in the z direction when heated to about 1560° F. (850° C.), according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 107. The method of any one of clauses 65-102, wherein the board has a High Temperature Shrinkage (S) of about 10% or less in the x-y directions (width-length) when heated to about 1560° F. (850° C.) according to ASTM C1795-15; and a Thermal Insulation Index (TI) of about 20 minutes or greater according to ASTM C1795-15.

Clause 108. The method of any one of clauses 65-102, wherein the board has a High Temperature Shrinkage (S) of about 10% or less in the x-y directions (width-length) when heated to about 1560° F. (850° C.) according to ASTM C1795-15; and a High Temperature Thickness Expansion in the z direction of at least about 0.1% when thickness is evaluated according to the analogous techniques and methodology of ASTM C1795-15.

Clause 109. The method of any one of clauses 65-102, wherein the board has a High Temperature Shrinkage (S) of about 10% or less in the x-y directions (width-length) when heated to about 1560° F. (850° C.) according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 110. The method of any one of clauses 65-102, wherein the board has a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

Clause 111. The method of any one of clauses 65-102, wherein the board has a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 112. The method of any one of clauses 65-102, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and a Thermal Insulation Index (TI) of about 20 minutes or greater according to ASTM C1795-15.

Clause 113. The method of any one of clauses 65-102, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

Clause 114. The method of any one of clauses 65-102, wherein the board has a High Temperature Shrinkage (S) of about 10% or less in the z direction when heated to about 1560° F. (850° C.), according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 115. The method of any one of clauses 65-102, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and a High Temperature Thickness Expansion in the z direction of at least about 0.1% when thickness is evaluated according to the analogous techniques and methodology of ASTM C1795-15.

Clause 116. The method of any one of clauses 65-102, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 117. The method of any one of clauses 65-102, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 118. The method of any one of clauses 65-102, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

Clause 119. The method of any one of clauses 65-102, wherein the board has a High Temperature Shrinkage (S) of about 10% or less in the x-y directions (width-length) when heated to about 1560° F. (850° C.) according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 120. The method of any one of clauses 65-102, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 121. The method of any one of clauses 65-102, wherein the board has a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 122. The method of any one of clauses 65-102, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and a High Temperature Thickness Expansion in the z direction of at least about 0.1% when thickness is evaluated according to the analogous techniques and methodology of ASTM C1795-15.

Clause 123. The method of any one of clauses 65-102, wherein the board has a High Temperature Shrinkage (S) of about 10% or less in the z direction when heated to about 1560° F. (850° C.), according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 124. The method of any one of clauses 65-102, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 125. The method of any one of clauses 65-102, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 126. The method of any one of clauses 65-102, wherein the board has a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 127. The method of any one of clauses 65-102, wherein the board has a High Temperature Shrinkage (S) of about 10% or less in the z direction when heated to about 1560° F. (850° C.), according to ASTM C1795-15; a High Temperature Shrinkage (S) of about 10% or less in the x-y directions (width-length) when heated to about 1560° F. (850° C.) according to ASTM C1795-15; a Thermal Insulation Index (TI) of about 20 minutes or greater according to ASTM C1795-15; a High Temperature Thickness Expansion in the z direction of at least about 0.1% when thickness is evaluated according to the analogous techniques and methodology of ASTM C1795-15; and where, when the board is cast at a nominal thickness of ⅝-inch, an assembly is constructed in accordance with any one of UL Design Numbers U305, U419 or U423, the assembly has a first side with a single layer of gypsum boards and a second side with a single layer of gypsum boards, and surfaces of gypsum boards on the first side of the assembly are heated in accordance with the time-temperature curve of ASTM E119-09a, while surfaces of gypsum boards on the second side of the assembly are provided with temperature sensors pursuant to ASTM E119-09a, the gypsum boards inhibit the transmission of heat through the assembly such that: a maximum single value of the temperature sensors is less than about 325° F. plus ambient temperature after at least about 50 minutes (e.g., 60 minutes); or an average value of the temperature sensors is less than about 250° F. plus ambient temperature after at least about 50 minutes (e.g., 60 minutes).

Clause 128. A gypsum board comprising: (a) face and back cover sheets; (b) a board core disposed between the face and back cover sheets, the core comprising set gypsum formed from a core slurry comprising water and stucco; (c) a back skim coat layer defining first and second skim coat faces, the back skim coat formed from a back skim coat slurry comprising water, stucco, and a skim coat intumescent material, the back skim coat disposed in bonding relation to the core, the first face of the skim coat layer facing the back cover sheet, and the second face of the skim coat layer facing the board core; and (d) the gypsum board having a High Temperature Shrinkage (S) of about 10% or less in the z direction when heated to about 1560° F. (850° C.), according to ASTM C1795-15.

Clause 129. The gypsum board of clause 128, wherein the skim coat intumescent material is expandable vermiculite, expandable graphite, perlite, or any combination thereof.

Clause 130. The gypsum board of clauses 128 or 129, wherein the skim coat intumescent material contains expandable vermiculite in the form of particles where at least about 50% of the particles are larger than about 50 mesh.

Clause 131. The gypsum board of any one of clauses 128-130, wherein the skim coat intumescent material is present in the back skim coat slurry in an amount of from about 2% to about 20% by weight of the stucco.

Clause 132. The gypsum board of any one of clauses 128-131, further comprising a face skim coat layer disposed between the core and the face cover sheet, the face skim coat layer formed from a face skim coat slurry, which can be the same or different than the back skim coat slurry, the face skim coat slurry comprising water, stucco, and optionally skim coat intumescent material, the core slurry comprising core intumescent material, the board having a density of about 40 lb/MSF or less and a nail pull resistance of at least about 72 $lb_f$ according to ASTM 473-10, method B.

Clause 133. The gypsum board of clause 132, further comprising two opposing edges on either end of the core, the edges formed from an edge slurry comprising water, stucco, and edge intumescent material, the edge slurry being the same or different than the face skim coat slurry and/or the back skim coat slurry, the core slurry comprising a core intumescent material, wherein the board has a density of about 40 lb/MSF or less and a nail pull resistance of at least about 72 $lb_f$ according to ASTM 473-10, method B.

Clause 134. A gypsum board comprising: (a) face and back cover sheets; (b) a board core disposed between the face and back cover sheets, the core comprising set gypsum formed from a core slurry comprising water and stucco; (c) a back skim coat layer defining first and second back skim coat faces, the back skim coat formed from a back skim coat slurry comprising water and stucco, the back skim coat disposed in bonding relation to the core, the first face of the back skim coat layer facing the back cover sheet, and the second face of the back skim coat layer facing the board core; (d) a face skim coat layer defining first and second face skim coat faces, the face skim coat formed from a face skim coat slurry comprising water and stucco, the face skim coat disposed in bonding relation to the core, the first face of the face skim coat layer facing the face cover sheet, and the second face of the face skim coat layer facing the board core, wherein the back skim coat slurry and the face skim coat slurry can be the same or different; (e) two opposing edges formed from an edge slurry containing water and stucco, wherein the edge slurry can be the same or different from each of the back skim coat slurry and the face skim coat slurry, the edges disposed on either end of the core, (f) the back skim coat slurry containing skim coat intumescent material and/or the edge slurry containing edge intumescent material; and (g) the gypsum board having a High Temperature Shrinkage (S) of about 10% or less in the z direction when heated to about 1560° F. (850° C.), according to ASTM C1795-15.

Clause 135. The gypsum board of clause 134, wherein the face skim coat slurry contains the skim coat intumescent material.

Clause 136. The gypsum board of clauses 134 or 135, wherein the core slurry further comprises core intumescent material, wherein a weight ratio between the core intumescent material and the skim coat intumescent material is from about 1:1.2 to about 1:4.

Clause 137. The gypsum board of any one of clauses 134-136, wherein the core slurry further comprises core intumescent material, wherein a weight ratio between the core intumescent material and the edge intumescent material is from about 1:1.5 to about 1:4.

Clause 138. The gypsum board of any one of clauses 134-137, wherein the board has a density of about 40 lb/MSF or less and a nail pull resistance of at least about 72 $lb_f$ according to ASTM 473-10, method B.

Clause 139. The gypsum board of any one of clauses 134-138, wherein the core slurry further comprises core intumescent material in an amount of from about 1% to about 5% by weight of the stucco.

Clause 140. The gypsum board of any one of clauses 134-139, wherein the edge slurry and the face skim coat slurry are the same and the edges are formed to be continuous from the face skim coat.

Clause 141. The gypsum board of any one of clauses 134-140, wherein the edge slurry and the back skim coat slurry are the same, and the edges are formed to be continuous from the back skim coat.

Clause 142. A method of making gypsum board, the method comprising: (a) mixing at least water, stucco, and core intumescent material to form a core slurry; (b) mixing at least water and stucco to form a face skim coat slurry; (c) applying the face skim coat slurry to a face cover sheet; (d) applying the core slurry to the face skim coat slurry as disposed on the face cover sheet to form a face composite having a core slurry surface and a paper surface, the core slurry forming a core in bonding relation to the face cover sheet; (e) mixing at least water and stucco to form a back skim coat slurry, the face skim coat and back skim coat slurry being the same or different; (f) applying the back skim coat slurry in a bonding relation to a back cover sheet to form a back composite having a skim coat slurry surface and a paper surface; (g) forming edges on either side of the core, the edges formed from an edge slurry comprising water and stucco, the edge slurry being the same or different from the face skim coat or back skim boat slurries, the back skim coat slurry containing skim coat intumescent material and/or the edge slurry containing edge intumescent material; (h) applying the back composite in a bonding relation to the face composite to form a board precursor, wherein the back skim coat slurry surface faces the core slurry surface; (i) drying the board precursor to form the gypsum board, the gypsum board having a High Temperature Shrinkage (S) of about 10% or less in the z direction when heated to about 1560° F. (850° C.), according to ASTM C1795-15.

Clause 143. The method of clause 142, wherein the core, skim coat and/or edge intumescent material comprises expandable vermiculite having a high volume expansion of at least about 300% to about 380% of its original volume after being placed for one hour in a chamber having a temperature of about 1560° F. (about 850° C.); expandable graphite having an expansion onset temperature of from about 220° F. (104° C.) to about 750° F. (400° C.), a particle size of from about 5 mesh to about 400 mesh, and/or a density of from about 20 pcf to about 120 pcf; or any combination thereof.

Clause 144. The method of clauses 142 or 143, wherein the skim coat intumescent material is present in the back skim coat slurry and/or face skim coat slurry in an amount of from about 4% to about 15% by weight of the stucco.

Clause 145. The method of any one of clauses 142-144, wherein a weight ratio between the core intumescent material and the skim coat intumescent material is from about 1:1.2 to about 1:4.

Clause 146. The method of any one of clauses 142-145, wherein a weight ratio between the core intumescent material and the edge intumescent material is from about 1:1.5 to about 1:4.

Clause 147. The method of any one of clauses 142-146, wherein the board has a density of about 40 lb/MSF or less and a nail pull resistance of at least about 72 $lb_f$ according to ASTM 473-10, method B.

It shall be noted that the preceding clauses are illustrative and not limiting. Other exemplary combinations are apparent from the entirety of the description herein. It will also be understood by one of ordinary skill in the art that various embodiments may be used in various combinations with the other embodiments provided herein.

The following examples further illustrate the disclosure but, of course, should not be construed as in any way limiting its scope.

Example 1

This example demonstrates the effect of fire resistance when intumescent additives such as vermiculite and expandable graphite are added at higher weight relative concentration (percentage) levels (compared to the main core) into 1) the skim coat layer attached to back paper (back skim coat layer); 2) the skim coat layer attached to face paper (face skim coat layer; or 3) optionally, two edges of the board.

Conventionally, expandable materials, such as vermiculite, expandable graphite, are uniformly distributed in the gypsum core to achieve improved fire resistance in full scale designs. Small scale tests are conducted (high temperature shrinkage and thermal insulation [TI]), with measured thermal, physical attributes of the samples, to qualitatively estimate the improvement in the fire performance. These small scale tests are conducted at a constant temperature (shrinkage—850° C. and TI—500° C.) and specifically for shrinkage, sample physical attributes before and after test are considered as a measure to identify the improved fire resistance levels.

However when fire tests are conducted, with gypsum board in full-scale assemblies, typically 10 ft×10 ft, temperature transmission through the assembly exhibits transient behavior. FIG. 2 depicts a general schematic illustration of a full-scale assembly 100 with gypsum board 110 and 120 protecting wood studs 130 and 140 on either side.

Exposed board 110 will be subjected to fire 150, according to ASTM E119 and temperature will be measured at different locations of the assembly (depicted as numerals 1-6 in FIG. 2). Unexposed board 120 is on the opposite side of the assembly more distant from the fire 150. For both exposed board 110 and unexposed board 120, the back paper side faces a cavity 160 between the studs 130 and 140 and boards 110 and 120. Maximum temperatures measured at these locations from a full scale fire test, at 30 minutes, are reported in Table 1.

TABLE 1

Temperature data from different locations reported in full-scale test

| Location | Temp at 15 max (° F./° C.) | Temp at 30 max (° F./° C.) | Temp at 45 max (° F./° C.) |
|---|---|---|---|
| 1 | 1428/776 | 1558/848 | 1644/896 |
| 2 | 260/127 | 862/461 | 1089/587 |
| 3 | 286/141 | 859/459 | 1120/604 |
| 5 | 199/93 | 695/368 | 1054/568 |
| 6 | 161/72 | 201/94 | 262/128 |

In order to fully observe the benefit of any expanding materials in a full-scale fire assembly, it has been found that temperatures in the core have to reach high enough levels where full expansion of these materials is observed. In the exposed board high enough temperatures are reached (2 and 3 locations) early and the benefit of vermiculite expansion will be observed.

Based on the data presented in Table 1, corresponding to location 5 and 6, the maximum temperature at 45 minutes is 568° C. and 128° C. respectively. This means the unexposed board temperature in the thickness direction ranges between 128° C. and 568° C. Thus, this example shows that, surprisingly and unexpectedly, the inventors have found that with uniform distribution of vermiculite in the core of the unexposed board, the full benefit of vermiculite expansion is not fully observed.

Figure 3:
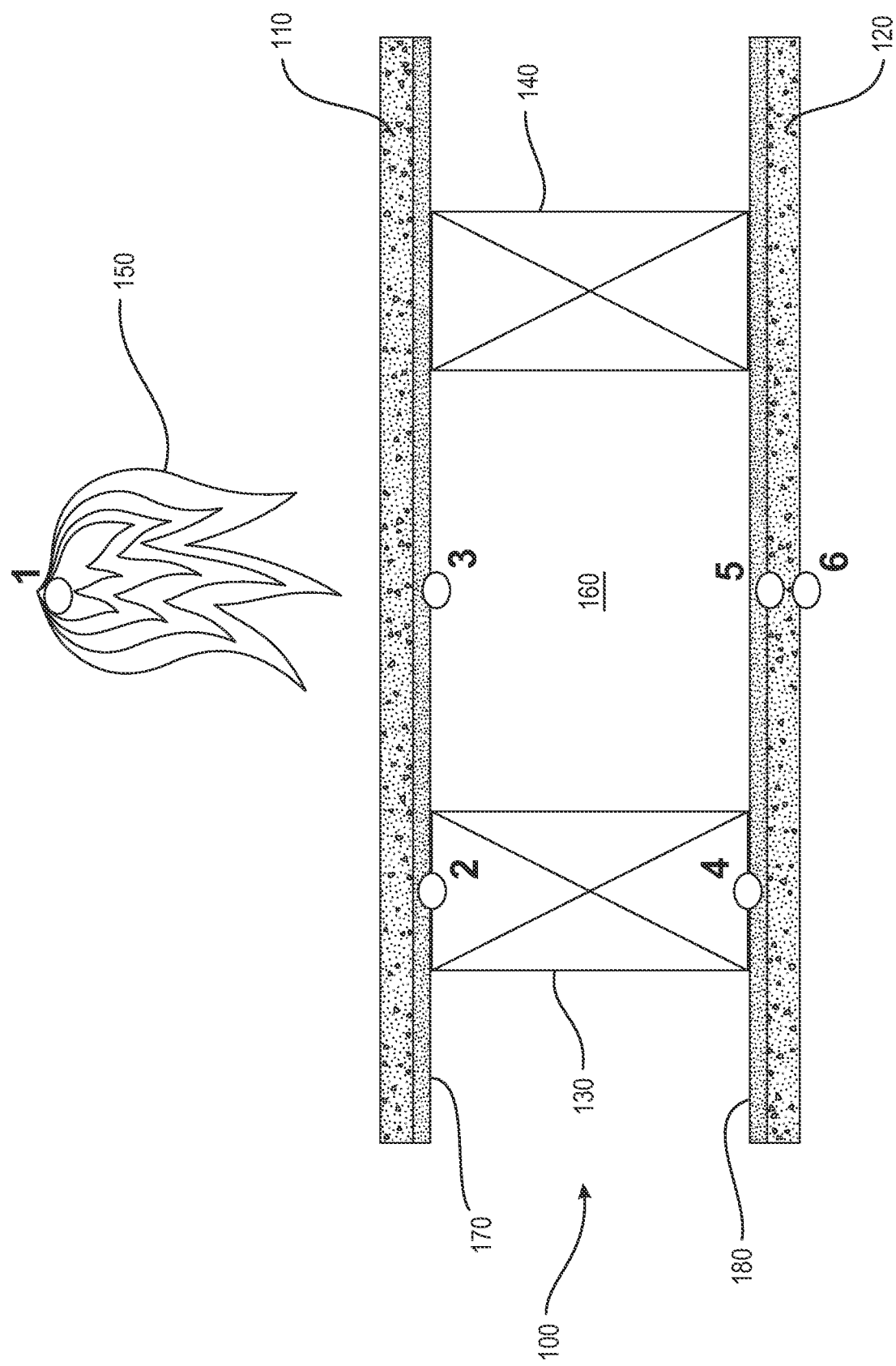
FIG. 3 is a schematic illustration of a full-scale assembly with a top skim coat layer as discussed in Example 1.

Surprisingly and unexpectedly, this example illustrates utilizing the expansion of the intumescent material (e.g., expandable vermiculite) to an enhanced or maximum extent by concentrating it more towards the cavity (e.g., in the skim coat attached to the back paper) as shown in FIG. 3. FIG. 3 includes a similar arrangement as in FIG. 2, with boards 110 and 120 additionally including face skim coats 170 and 180, respectively. Both skim coats 170 and 180 were formed from slurries containing intumescent material in the form of Grade 4 vermiculite in an amount of about 6-10% by weight of stucco. A core of the boards 110 and 120 was formed from a slurry that contained less than 5% of the Grade 4 vermiculite by weight of stucco. Corresponding to locations 3 and 5, the maximum temperature at 45 minutes is 604° C. and 568° C. respectively. At these temperatures, vermiculite will start to expand more and provides the improved fire resistance. The vermiculite exhibits full expansion at a temperature range of about 600° C. and can provide the improved fire resistance as well. Above 1200° F. (650° C.), expandable graphite can begin to oxidize as the carbon of the graphite reacts with oxygen and produces carbon dioxide. The board may shrink as this oxidation reaction occurs. However, corresponding to locations 3 and 5, the maximum temperature at 45 minutes is 604° C. and 568° C. respectively. At these temperatures, expandable graphite exhibits full expansion and will not oxidize. Therefore, the enhanced or full benefit of graphite expansion can be achieved.

Optionally, a small amount of vermiculite can be applied to the two edges of the boards. During a fire, the edge expands to seal the gap between adjoining gypsum panels.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. "Bonding relation" does not necessarily mean two components are directly in contact, touching, or otherwise contiguous. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A gypsum board comprising:
   (a) face and back cover sheets;
   (b) a board core disposed between the face and back cover sheets, the core comprising set gypsum formed from a core slurry comprising water, stucco, and core intumescent material;
   (c) a back skim coat layer defining first and second skim coat faces, the back skim coat formed from a back skim coat slurry comprising water, stucco, and a skim coat intumescent material in an amount of from about 2% to about 20% by weight of the stucco, the back skim coat disposed in bonding relation to the core, the first face of the skim coat layer facing the back cover sheet, and the second face of the skim coat layer facing the board core; and
   (d) the gypsum board having a High Temperature Shrinkage (S) of about 10% or less in the z direction when heated to about 1560° F. (850° C.), according to ASTM C1795-15;
   wherein a weight ratio between the core intumescent material and the skim coat intumescent material is from about 1:1.2 to about 1:4; and
   wherein the board has a density of about 38 lb/MSF or less.

2. The gypsum board of claim 1, wherein the skim coat intumescent material is expandable vermiculite, expandable graphite, perlite, or any combination thereof.

3. The gypsum board of claim 2, wherein the skim coat intumescent material contains expandable vermiculite in the form of particles where at least about 50% of the particles are larger than about 50 mesh.

4. The gypsum board of claim 1, further comprising a face skim coat layer disposed between the core and the face cover sheet, the face skim coat layer formed from a face skim coat slurry, which can be the same or different than the back skim coat slurry, the face skim coat slurry comprising water, stucco, and optionally skim coat intumescent material, the board having a nail pull resistance of at least about 72 lbf according to ASTM 473-10, method B.

5. The gypsum board of claim 4, further comprising two opposing edges on either end of the core, the edges formed from an edge slurry comprising water, stucco, and edge intumescent material, the edge slurry being the same or different than the face skim coat slurry and/or the back skim coat slurry, wherein the board has a nail pull resistance of at least about 72 lbf according to ASTM 473-10, method B.

6. A gypsum board comprising:
   (a) face and back cover sheets;
   (b) a board core disposed between the face and back cover sheets, the core comprising set gypsum formed from a core slurry comprising water, stucco, and core intumescent material;
   (c) a back skim coat layer defining first and second back skim coat faces, the back skim coat formed from a back skim coat slurry comprising water and stucco, the back skim coat disposed in bonding relation to the core, the first face of the back skim coat layer facing the back cover sheet, and the second face of the back skim coat layer facing the board core;
   (d) a face skim coat layer defining first and second face skim coat faces, the face skim coat formed from a face skim coat slurry comprising water and stucco, the face skim coat disposed in bonding relation to the core, the first face of the face skim coat layer facing the face cover sheet, and the second face of the face skim coat layer facing the board core, wherein the back skim coat slurry and the face skim coat slurry can be the same or different;
   (e) two opposing edges formed from an edge slurry containing water and stucco, wherein the edge slurry can be the same or different from each of the back skim coat slurry and the face skim coat slurry, the edges disposed on either end of the core,
   (f) the edge slurry containing edge intumescent material; and
   (g) the gypsum board having a High Temperature Shrinkage (S) of about 10% or less in the z direction when heated to about 1560° F. (850° C.), according to ASTM C1795-15;
   wherein a weight ratio between the core intumescent material and the edge intumescent material is from about 1:1.5 to about 1:4; and
   wherein the board has a density of about 38 lb/MSF or less.

7. The gypsum board of claim 6, wherein the face skim coat slurry contains the skim coat intumescent material.

8. The gypsum board of claim 6, wherein the board has a nail pull resistance of at least about 72 lbf according to ASTM 473-10, method B.

9. The gypsum board of claim 6, wherein the core slurry further comprises core intumescent material in an amount of from about 1% to about 5% by weight of the stucco.

10. The gypsum board of claim 6, wherein the edge slurry and the face skim coat slurry are the same and the edges are formed to be continuous from the face skim coat.

11. The gypsum board of claim 6, wherein the edge slurry and the back skim coat slurry are the same, and the edges are formed to be continuous from the back skim coat.

12. The gypsum board of claim 1, wherein the board has a ratio of Thermal Insulation Index/Density (TI/D) of about 0.6 minutes/pounds per cubic foot (about 0.038 minutes/(kg/m$^3$)) or more.

13. The gypsum board of claim 6, wherein the board has a ratio of TI/D of about 0.6 minutes/pounds per cubic foot (about 0.038 minutes/(kg/m$^3$)) or more.

14. The gypsum board of claim 1, wherein the board has a density of about 35 lb/MSF or less.

15. The gypsum board of claim 6, wherein the board has a density of about 35 lb/MSF or less.

16. A method of making gypsum board, the method comprising:
   (a) mixing at least water, stucco, and core intumescent material to form a core slurry;
   (b) mixing at least water and stucco to form a face skim coat slurry;
   (c) applying the face skim coat slurry to a face cover sheet;
   (d) applying the core slurry to the face skim coat slurry as disposed on the face cover sheet to form a face composite having a core slurry surface and a paper surface, the core slurry forming a core in bonding relation to the face cover sheet;
   (e) mixing at least water and stucco to form a back skim coat slurry, the face skim coat and back skim coat slurry being the same or different, wherein the skim coat intumescent material is present in the back skim coat slurry and/or face skim coat slurry in an amount of from about 4% to about 15% by weight of the stucco;
   (f) applying the back skim coat slurry in a bonding relation to a back cover sheet to form a back composite having a skim coat slurry surface and a paper surface;
   (g) forming edges on either side of the core, the edges formed from an edge slurry comprising water and stucco, the edge slurry being the same or different from the face skim coat or back skim boat slurries, the back skim coat slurry containing skim coat intumescent material and/or the edge slurry containing edge intumescent material;
   (h) applying the back composite in a bonding relation to the face composite to form a board precursor, wherein the back skim coat slurry surface faces the core slurry surface;
   (i) drying the board precursor to form the gypsum board, the gypsum board having a High Temperature Shrinkage (S) of about 10% or less in the z direction when heated to about 1560° F. (850° C.), according to ASTM C1795-15;
   wherein the board has a density of about 38 lb/MSF or less.

17. The method of claim 16, wherein the core, skim coat and/or edge intumescent material comprises expandable vermiculite having a high volume expansion of at least about 300% to about 380% of its original volume after being placed for one hour in a chamber having a temperature of about 1560° F. (about 850° C.); expandable graphite having an expansion onset temperature of from about 220° F. (104° C.) to about 750° F. (400° C.), a particle size of from about 5 mesh to about 400 mesh, and/or a density of from about 20 pcf to about 120 pcf; or any combination thereof.

18. The method of claim 16, wherein a weight ratio between the core intumescent material and the skim coat intumescent material is from about 1:1.2 to about 1:4.

19. The method of claim 16, wherein a weight ratio between the core intumescent material and the edge intumescent material is from about 1:1.5 to about 1:4.

20. The method of claim 16, wherein the board has a nail pull resistance of at least about 72 lbf according to ASTM 473-10, method B.

\* \* \* \* \*